United States Patent [19]

Saito et al.

[11] Patent Number: 6,078,757
[45] Date of Patent: *Jun. 20, 2000

[54] PHOTOGRAPHIC CAMERA SYSTEM

[75] Inventors: Takahiko Saito, Kanagawa; Hideki Toshikage, Saitama; Norifumi Kawashima, Tokyo, all of Japan

[73] Assignee: Sony Corporation, Tokyo, Japan

[ * ] Notice: This patent is subject to a terminal disclaimer.

[21] Appl. No.: 09/309,666

[22] Filed: May 11, 1999

Related U.S. Application Data

[62] Division of application No. 08/948,528, Oct. 9, 1997, Pat. No. 6,006,042, which is a continuation of application No. 08/756,599, Nov. 27, 1996, Pat. No. 5,729,777, which is a division of application No. 08/444,681, May 19, 1995, Pat. No. 5,600,386, which is a continuation-in-part of application No. 08/329,546, Oct. 26, 1994, Pat. No. 5,583,591, which is a continuation-in-part of application No. 08/026,415, Mar. 4, 1993, abandoned.

[30] Foreign Application Priority Data

Mar. 17, 1992 [JP] Japan ................................ 4-060684
Mar. 23, 1992 [JP] Japan ................................ 4-065304

[51] Int. Cl.⁷ .................................................. G03B 17/24
[52] U.S. Cl. ............................................ 396/311; 396/429
[58] Field of Search ................................... 396/311, 429

[56] References Cited

U.S. PATENT DOCUMENTS

| | | | |
|---|---|---|---|
| 2,377,341 | 6/1945 | Hannum | 95/31 |
| 3,490,844 | 1/1970 | Sapp, Jr. | 355/40 |
| 3,674,365 | 7/1972 | Kohler et al. | 355/40 |
| 4,080,061 | 3/1978 | von Stein et al. | 355/38 |
| 4,320,965 | 3/1982 | Kimura et al. | 355/74 |
| 4,482,924 | 11/1984 | Brownstein | 358/302 |
| 4,642,700 | 2/1987 | Ohta et al. | 358/285 |
| 4,645,334 | 2/1987 | Shimada et al. | 355/40 |
| 4,650,304 | 3/1987 | Harvey | 354/21 |
| 4,737,825 | 4/1988 | Davis | 355/54 |
| 4,777,515 | 10/1988 | Aikoh et al. | 355/64 |
| 4,977,419 | 12/1990 | Wash et al. | 354/76 |
| 5,049,908 | 9/1991 | Murakami | 354/173.1 |
| 5,066,971 | 11/1991 | Kodaira | 354/465 |
| 5,072,253 | 12/1991 | Patton | 355/40 |
| 5,086,311 | 2/1992 | Naka et al. | 354/195.1 |
| 5,151,726 | 9/1992 | Iwashita et al. | 354/75 |
| 5,229,810 | 7/1993 | Cloutier et al. | 354/40 |
| 5,245,373 | 9/1993 | Ogawa et al. | 354/106 |

(List continued on next page.)

FOREIGN PATENT DOCUMENTS

| | | | |
|---|---|---|---|
| 0212443 | 3/1987 | European Pat. Off. | G03B 19/00 |
| 0357355 | 3/1990 | European Pat. Off. | G03B 1/02 |
| 0476907 | 3/1992 | European Pat. Off. | |
| 0561592 | 9/1993 | European Pat. Off. | G03B 17/24 |
| 57-48729 | 3/1982 | Japan | G03B 27/32 |
| 1282530 | 11/1989 | Japan | G03B 17/24 |
| 1282531 | 11/1989 | Japan | G03B 17/24 |
| 1282533 | 11/1989 | Japan | G03B 27/32 |
| 1282536 | 11/1989 | Japan | G03B 27/46 |

OTHER PUBLICATIONS

Fujifilm Advanced Photo System Minilab Guide, Unknown Publication Date.
Kodak Advantix, Internet Information found at the Kodak Website Unknown Publication Date.

*Primary Examiner*—David M. Gray
*Attorney, Agent, or Firm*—Jay H. Maioli

[57] ABSTRACT

A photographic system includes a photographic camera that can successively expose a photographic film and an automatic printer for automatically printing the exposed and processed photographic film. The photographic camera magnetically or optically records at an area away from an exposure area of the photographic film an aspect ratio information signal indicative of a selected aspect ratio and a frame number signal, and the automatic printer automatically produces prints from the photographic film using the magnetically or optically recorded aspect ratio information signal and frame number signal detected from the photographic film.

6 Claims, 23 Drawing Sheets

U.S. PATENT DOCUMENTS

| | | | |
|---|---|---|---|
| 5,258,859 | 11/1993 | Wada et al. | 358/487 |
| 5,274,422 | 12/1993 | Yoshikawa | 355/77 |
| 5,325,138 | 6/1994 | Nagata | 354/106 |
| 5,347,403 | 9/1994 | Uekusa | 360/3 |
| 5,382,508 | 1/1995 | Ikenoue | 430/496 |
| 5,453,815 | 9/1995 | Yoshikawa | 355/74 |
| 5,469,209 | 11/1995 | Gunday et al. | 348/96 |
| 5,471,265 | 11/1995 | Shibata et al. | 354/76 |
| 5,493,355 | 2/1996 | Kazami | 354/106 |
| 5,526,255 | 6/1996 | Shenk | 364/167.1 |
| 5,570,147 | 10/1996 | Saito et al. | 396/429 |
| 5,583,591 | 12/1996 | Saito et al. | 396/429 |
| 5,583,610 | 12/1996 | Yoshikawa | 355/74 |
| 5,600,386 | 2/1997 | Saito et al. | 396/315 |
| 5,652,643 | 7/1997 | Saito et al. | 396/311 |
| 5,721,991 | 2/1998 | Saito et al. | 396/311 |
| 5,729,777 | 3/1998 | Saito et al. | 396/311 |
| 5,742,855 | 4/1998 | Saito et al. | 396/429 |
| 5,752,114 | 5/1998 | Saito et al. | 396/429 |

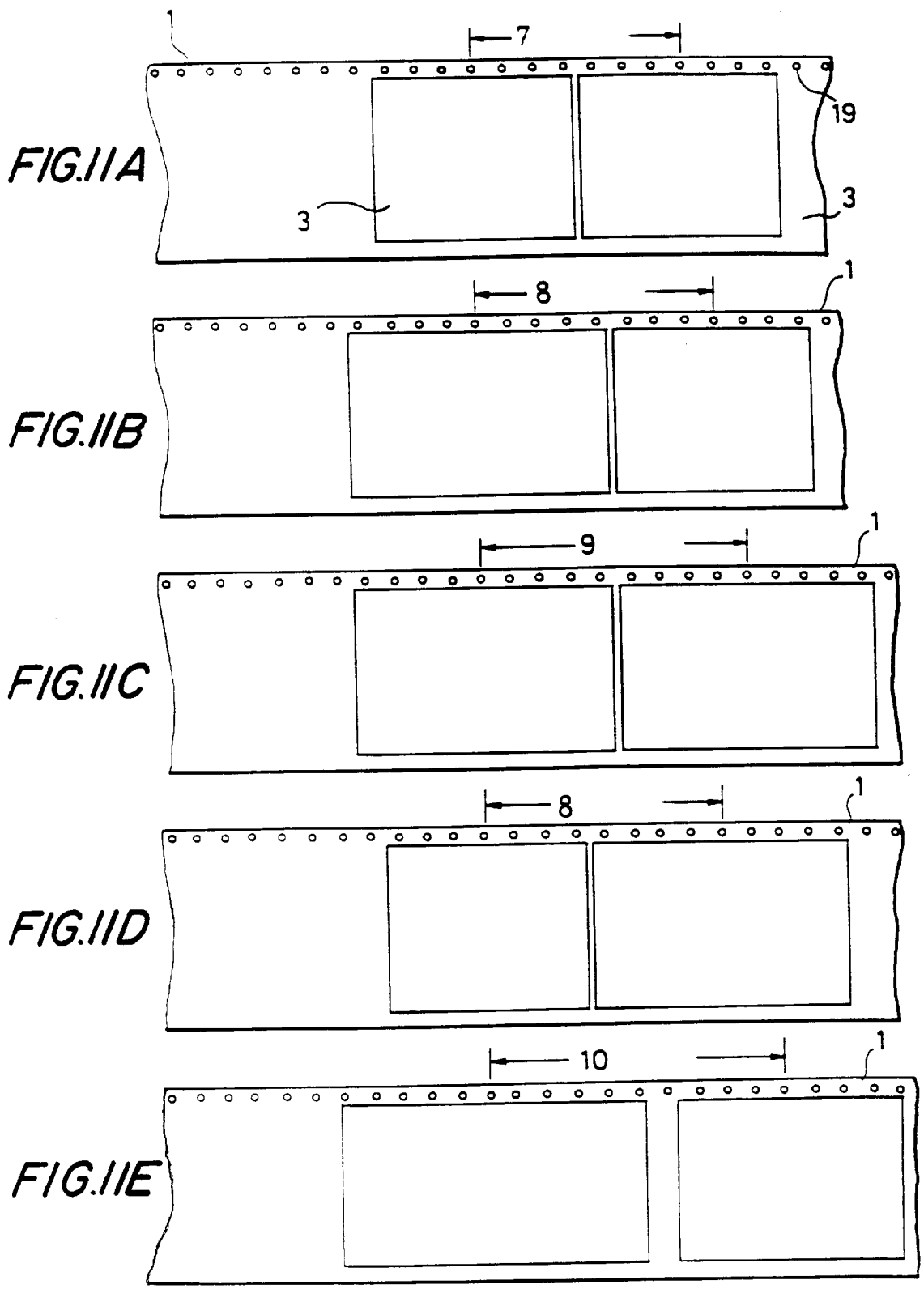

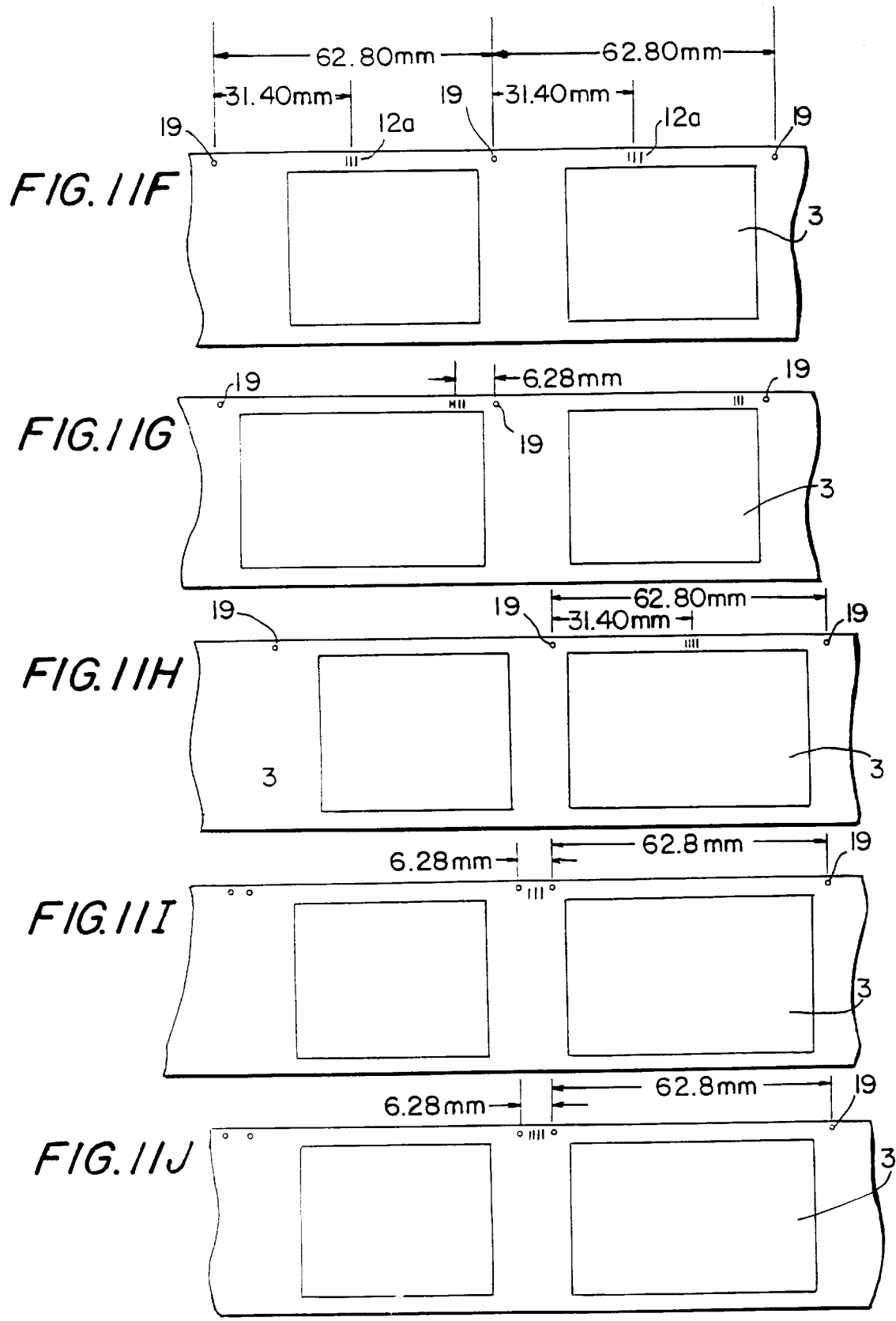

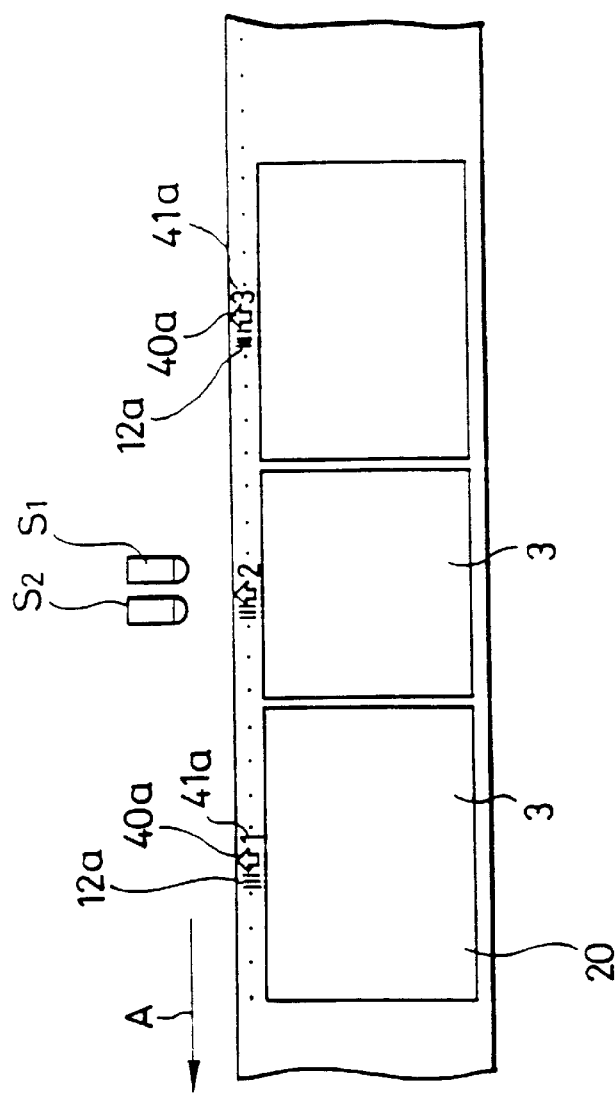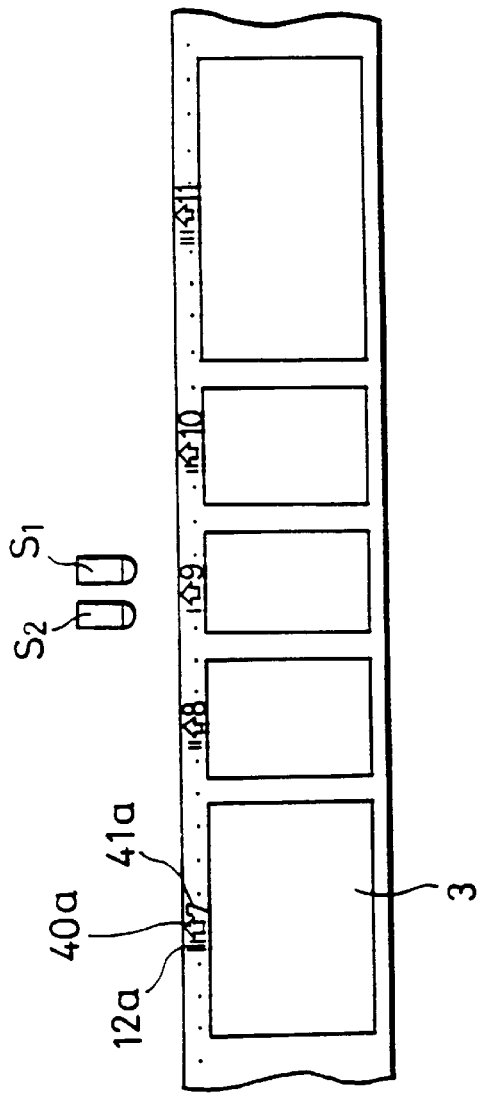

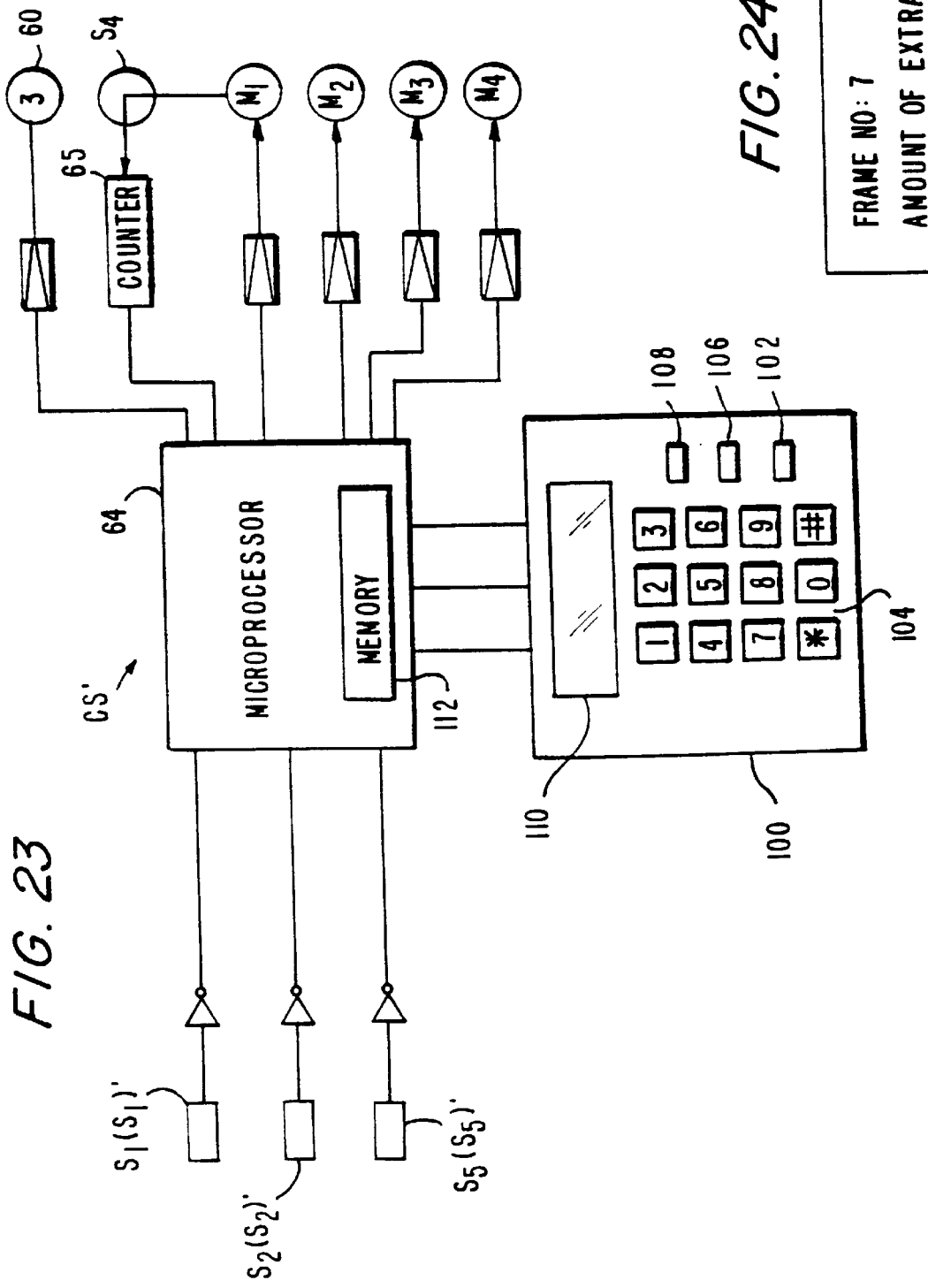

PHOTOGRAPHIC CAMERA SYSTEM

CROSS REFERENCE TO RELATED APPLICATIONS

This application is a division of U.S. Ser. No. 08/948,528 filed Oct. 9, 1997, now U.S. Pat. No. 6,006,042, which is a continuation in part of U.S. Ser. No. 08/756,599 filed Nov. 27, 1996, now U.S. Pat. No. 5,729,777, which is a division of U.S. Ser. No. 08/444,681 filed May 19, 1995, now U.S. Pat. No. 5,600,386, which is a continuation in part of U.S. Ser. No. 08/329,546 filed Oct. 26, 1994, now U.S. Pat. No. 5,583,591, which is a continuation in part of U.S. Ser. No. 08/026,415 filed Mar. 4, 1993, now abandoned.

FIELD OF THE INVENTION

The present invention relates to a photographic system for producing pictures, and more particularly to a photographic camera, and a film printing device for printing processed photographic film having frame information and aspect information recorded thereon by the photographic camera.

BACKGROUND

The photographic film that is in the most widespread use today is a 35-mm film (system 135), as provided for by the Japanese Industrial Standards (JIS) and the International Organization of Standardization (IOS).

U.S. Pat. No. 5,049,908 describes a photographic camera and a film therefor, with the film being of a 35-mm size, devoid of sprocket holes of the size used in present 35-mm films, and having an effective image area of about 30 mm across the film, thereby providing an increased effective usable film area.

U.S. Pat. No. 4,384,774 and U.S. Pat. No. 5,066,971 propose cameras capable of switching between half and full frame sizes during film exposure. When film exposed using these proposed cameras is spliced into a long, single, continuous film strip for simultaneous batch processing, the continuous film strip also contains different frame sizes.

Film processing laboratories are therefore required to form notches indicative of frame centers for automatically printing spliced films with different frame sizes after they have been developed. For example, as disclosed in U.S. Pat. No. 4,557,591, a human operator manually notches a side edge of a spliced film and, hence, the notches are used to control feeding of the film. With the disclosed process, it is impossible to process several thousand film strips per hour and, therefore, the cost of processing such exposed film is relatively high. As a consequence, film with different frame sizes may not be accepted by processing laboratories in Japan.

Many film processing laboratories all over the world also do not accept film with frames exposed in half size because they do not want different frame sizes to be contained in a single spliced film that is stored in a single film magazine for subsequent processing and printing. This problem arises because the different frame sizes can be recognized only after the film has been developed. One solution would be to apply marking seals to exposed films so that film having different frame sizes can be distinguished and sorted out for individual processing and printing. Nevertheless, use of marking seals would not essentially solve the problem, because it would be difficult to supply such marking seals consistently over a number of years.

U.S. Pat. No. 5,382,508 to Ikenoue apparently relates to a photographic film having image areas, a first data-recording portion located on a first side of the image area used by the film manufacturer for recording film information, and a second data-recording portion located on a second side of the image area opposite the first side for recording user-provided data, wherein the second data-recording portion has perforations for positioning the image area.

U.S. Pat. No. 5,453,815 to Yoshikawa apparently relates to a photographic printer and printing method for producing photographic prints of various aspect ratios from a photographic film based on data recorded on the photographic film.

U.S. Pat. No. 5,471,265 to Shibata et al. apparently relates to a photographic camera and printer for making photographic prints of various aspect ratios. the camera uses photographic film having perforations on one side and records aspect information on the side of the film with the perforations.

The Ikenoue, Yoshikawa, and Shibata et al. patents may be used to automatically print a picture having a predetermined picture aspect ratio in response to aspect ratio information recorded on the film, either as a single processed film or as part of a number of processed film strips spliced together so that prints are made continuously from the first frame to the last frame of the spliced film.

Film processing or printing laboratories are often required to print a specific frame or frames of a single processed film strip or of a spliced film after the film has been developed or when reprints or extra prints are requested. If such a request is proposed by a customer, the processing laboratories must set up the processed film in the printer and manually define the specific frame number to be printed. Presently, it is impossible to find the specific frame number of the film automatically so the cost of producing extra prints or printing a specific frame number is relatively high compared with the cost of producing standard prints.

The patents identified above do not appear to show or suggest a photographic system having a printer for automatically printing a specific frame or frames from processed photographic film having aspect ratio information recorded in a marginal area of the film.

OBJECTS AND SUMMARY OF THE INVENTION

Accordingly, it is an object of the present invention to provide a photographic system that can eliminate the above-noted drawbacks inherent in prior proposed systems.

It is another object of the present invention to provide a photographic printer that can automatically print a specific frame or frames of a processed film having aspect ratio information recorded thereon.

According to an aspect of the present invention, there is provided a photographic system having a photographic camera including a camera body, a first housing disposed in the camera body for housing a photographic film cartridge containing photographic film, a second housing disposed in the camera body for housing the photographic film drawn from the photographic film cartridge, film drive means disposed in the camera body for driving the photographic film between the first and second housings, exposure means disposed between the first and second housings for exposing an image of a subject to be recorded in an effective exposure area of the photographic film, and recording means disposed in the camera body for recording an aspect ratio information signal and frame information such as a frame number signal in a marginal area along an edge of the photographic film in a film drive direction, wherein the aspect ratio information signal indicates an aspect of the effective area to be printed on photosensitive paper and the frame information signal indicates that a frame of the effective exposure area to be printed on the photosensitive paper; and a photographic film printer for printing the image exposed by the camera, the printer including a printer body, light source and mask means for exposing the photosensitive paper, processed photographic film drive means disposed in the printer body for driving a processed photographic film, first detecting means disposed in the printer body for detecting the aspect ratio information signal recorded in the processed photographic film, second detecting means disposed in the printer body for detecting the frame information signal recorded in the processed photographic film, and logic circuit means connected to the first and second detecting means, light source and mask means, and processed photographic film drive means, controller means connected to the logic circuit means and having a frame number designating input means for designating a specific frame number of the processed photographic film, whereby the processed photographic film drive means is stopped at the specific frame number corresponding to a designated frame in response to the control of the logic circuit means when the second detecting means detects the designated frame, and the image of the designated frame is printed on the photosensitive paper through operation of the light source and mask means controlled by the logic circuit means. The image printed on the photosensitive paper has a predetermined aspect ratio which is controlled by the mask means based upon the detected aspect ratio information signal.

According to another aspect of the present invention, there is provided a photographic film printer comprising a printer body, processed photographic film drive means disposed in the printer body for driving a processed photographic film, first detecting means disposed in the printer body for detecting an aspect ratio information signal, the aspect ratio information signal being recorded in a marginal area of the processed photographic film along an edge of the photographic film and indicating an aspect ratio of an exposure area on the processed photographic film to be printed on photosensitive paper, second detecting means disposed in the printer body for detecting a frame information signal, the frame information signal being formed in the marginal area of the processed photographic film along an edge of the photographic film, light source and mask means for exposing the photosensitive paper, logic circuit means connected to the first and second detecting means, and controller means connected to the logic circuit means and having a frame number designating input means for designating a specific frame number of the processed photographic film, whereby the processed photographic film drive means is stopped at a designated frame in response to the control of the logic circuit means when the second detecting means detects the designated frame, and the image of the designated frame is printed on the photosensitive paper through operation of the light source and mask means controlled by the logic circuit means. The image printed on the photosensitive paper has a predetermined aspect ratio which is controlled by the mask means based upon the detected aspect ratio information signal.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIGS. 11A through 11J are fragmentary front elevational views showing positional relationships of frames exposed on film using a photographic camera according to an embodiment of the present invention;

FIGS. 16A through 16D are fragmentary front elevational views showing the relationship between a processed film and sensors in the automatic printer shown in FIG. 13;

FIG. 23 is a block diagram of a control system used in an automatic printer according to an embodiment of the present invention; and FIG. 24 is a schematic diagram showing an example of various characters displayed in a display of the control system shown in FIG. 23.

DETAILED DESCRIPTION OF PREFERRED EMBODIMENTS

Figure 1:
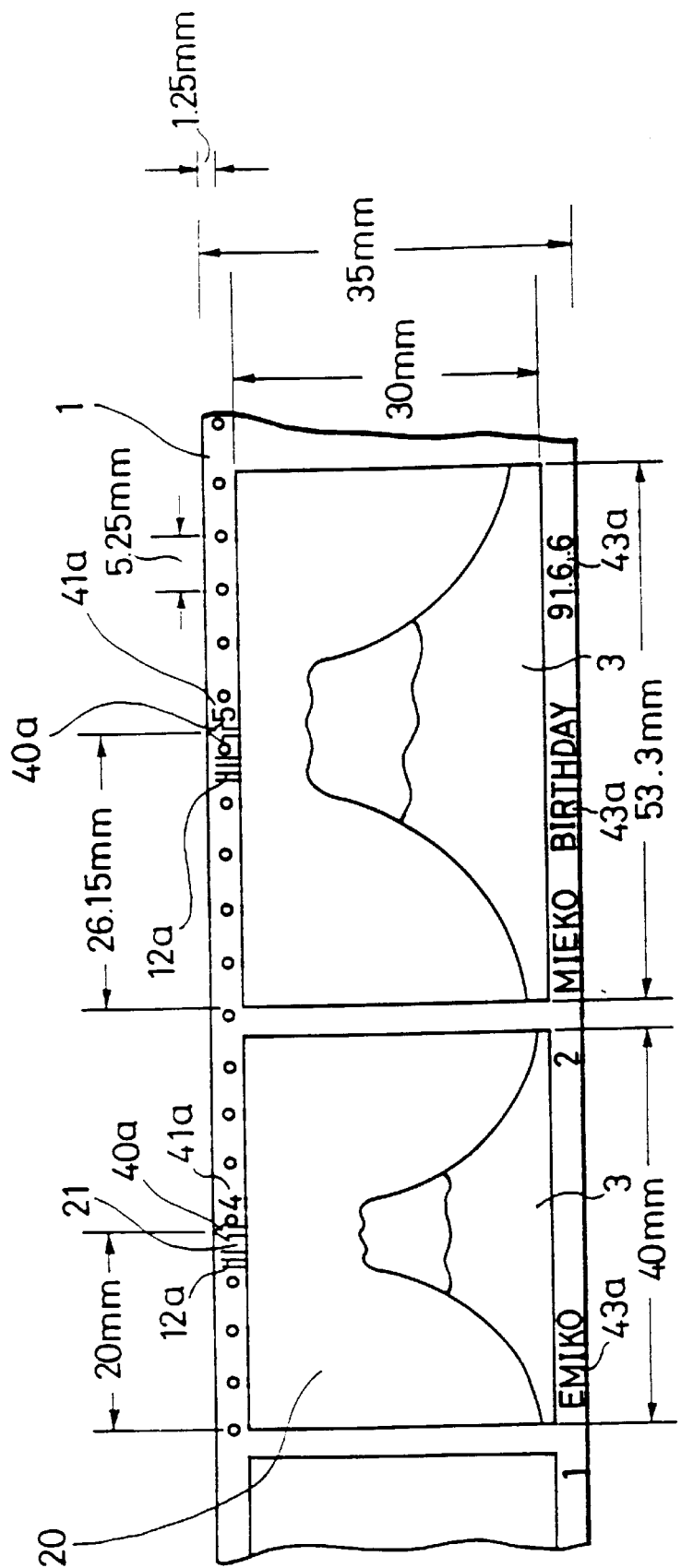
FIG. 1 is a fragmentary front elevational view of film that has been exposed using a photographic camera according to an embodiment of the present invention.
Figure 2:
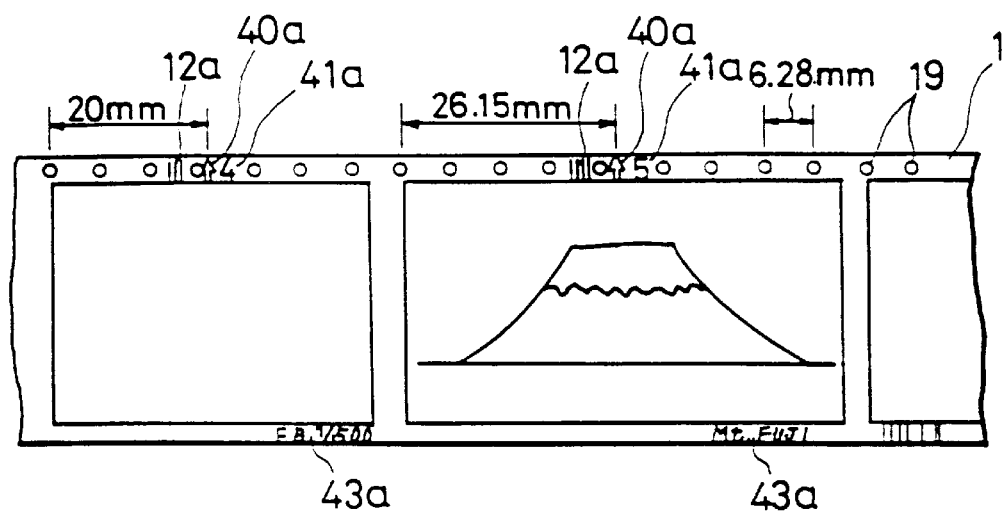
FIG. 2 is a fragmentary front elevational view of film that has been exposed using a photographic camera according to an embodiment of the present invention.
Figure 3A:
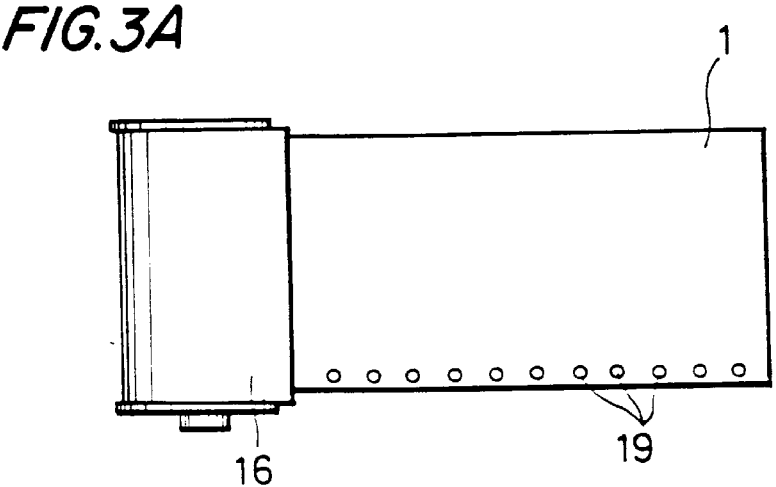
FIGS. 3A and 3B are elevational views of film cartridges that can be used in a photographic camera according to an embodiment of the present invention.
Figure 3B:
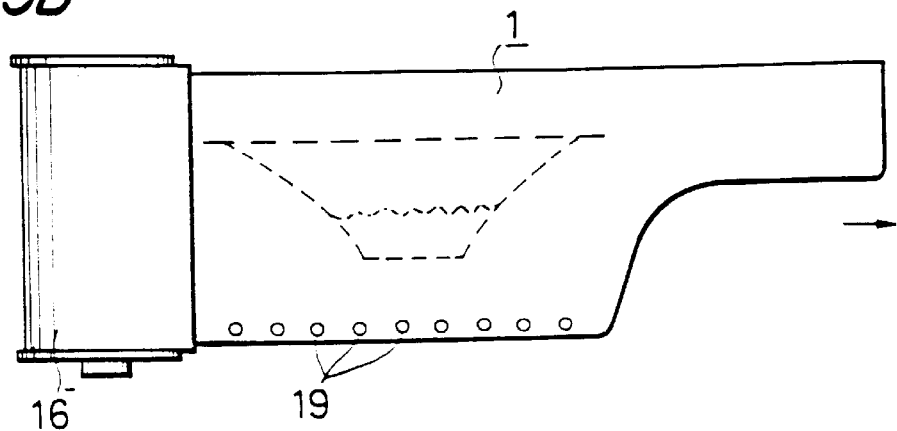

A 35-mm photographic film 1 that can be used in a 35-mm photographic camera of the present invention is described below with reference to FIGS. 1, 2, 3A, and 3B, in which FIGS. 1 and 2 show the 35-mm photographic film 1 after it has been exposed, and FIGS. 3A and 3B show the 35-mm photographic film 1 before it has been exposed.

As shown in FIGS. 3A and 3B, the photographic film 1 is stored in a film cartridge 16 and has an end extending out of the film cartridge 16. Images that are photographed on the photographic film 1 are turned upside down by lenses, so that the upper end of an image is positioned on a lower portion of the photographic film 1. FIG. 3B shows, by way of example, a photographed image of a subject in broken lines, with the image appearing as being turned upside down on the photographic film 1.

The photographic film 1 shown in FIGS. 1, 2, 3A, and 3B has a series of film position-detecting holes 19 defined along an unexposed marginal edge area of the photographic film 1, which has a width of about 2.5 mm. This marginal area is used to control the film, to read data therefrom, and to write data thereto when taking a picture. The film position-detecting holes 19 have a diameter of about 1 mm and are spaced at a constant, predetermined pitch. The pitch of the film position-detecting holes 19 in the photographic film 1 shown in FIG. 1 is 5.25 mm, for example, and the pitch of the film position-detecting holes 19 in the photographic film 1 shown in FIG. 2 is 6.28 mm.

Figure 4A:
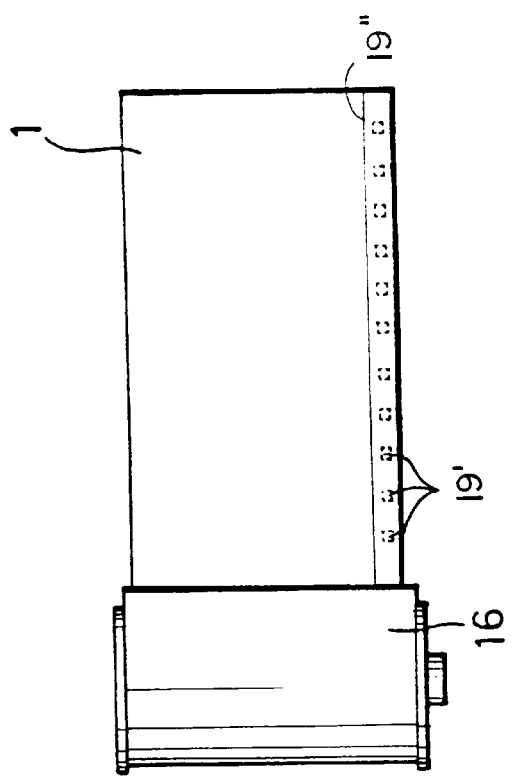
FIGS. 4A and 4B are elevational views of film cartridges that can be used in a photographic camera according to an embodiment of the present invention.
Figure 4B:
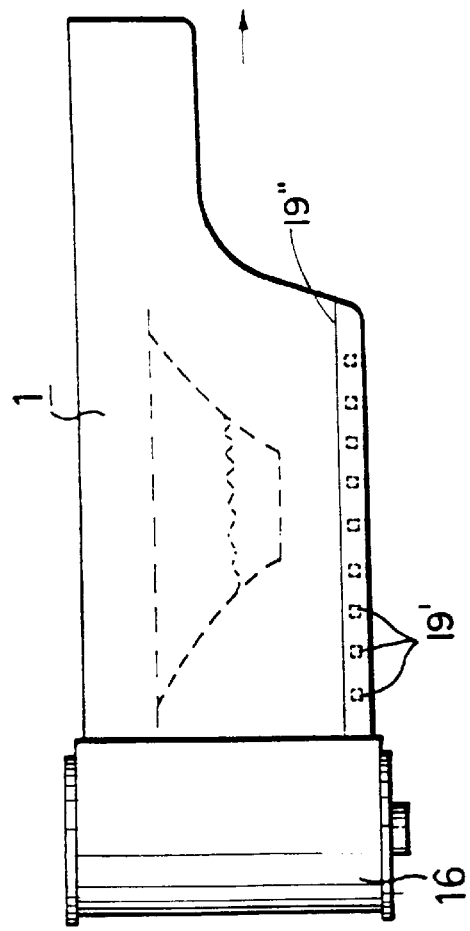

The film position-detecting holes 19 can be replaced by magnetic marks 19' spaced at a predetermined constant pitch and made by a suitable magnetic head on a magnetic edge portion 19" formed on the film 1, as shown in FIGS. 4A and 4B. The magnetic marks 19' are shown as broken lines on the magnetic strip 19" in FIGS. 4A and 4B, because they are not actually visible. Alternatively, the marks 19' may be formed as small dots of magnetic material, such as iron oxide, deposited on the film 1 and detected by the magnetic head.

Distances by which different photographic film 1 with film position-detecting holes 19 or magnetic marks 19' spaced at pitches of 5.25 mm and 6.28 mm are advanced to feed frames of different picture sizes are given in Table 1 below.

TABLE 1

| Picture Size (width × length) | Pitch = 6.28 mm | Pitch = 5.25 mm |
|---|---|---|
| NTSC-matched (30 mm × 40 mm), full size | 43.96 mm = 6.28 mm × 7 pitches | 42.0 mm = 5.25 mm × 8 pitches |
| HDTV-matched (30 mm × 53.3 mm), full size | 56.52 mm = 6.28 mm × 9 pitches | 57.75 mm = 5.25 mm × 11 pitches |

TABLE 1-continued

| Picture Size (width × length) | Pitch = 6.28 mm | Pitch = 5.25 mm |
|---|---|---|
| HDTV-matched (30 mm × 16.9 mm), half size | 18.84 mm = 6.28 mm × 3 pitches | 21.0 mm = 5.25 mm × 4 pitches |
| NTSC-matched (30 mm × 22.5 mm), half size | 25.12 mm = 6.28 mm × 4 pitches | 26.25 mm = 5.25 mm × 5 pitches |

The photographic film 1 shown in FIG. 3A has film position detecting holes 19 that are positioned along an upper marginal edge area thereof. No tongue is provided at the leading end of the photographic film 1 so no tongue-removing process will subsequently be required. Because no tongue-removing process will be required, the subsequent processing of the photographic film 1 is less costly. This applies to the photographic film 1 shown in FIG. 4A as well.

The photographic film 1 shown in FIG. 3B also has film position detecting holes 19 that are positioned in an upper marginal edge area thereof. The photographic film 1 has a tongue at its leading end on its lower portion. The tongue at the leading end of the photographic film 1 is vertically opposite in position to a tongue of an ordinary 35-mm photographic film that is now generally commercially available. If a photocoupler is used in a photographic camera for detecting the film position detecting holes 19, when the photographic film 1 is loaded into the photographic camera, the marginal edge with the film position detecting holes 19 is not required to be manually inserted into the photocoupler, but is automatically inserted into the photocoupler when the photographic film 1 is wound by a film transport mechanism in the photographic camera. This also applies to the film shown in FIG. 4B.

Figure 5:
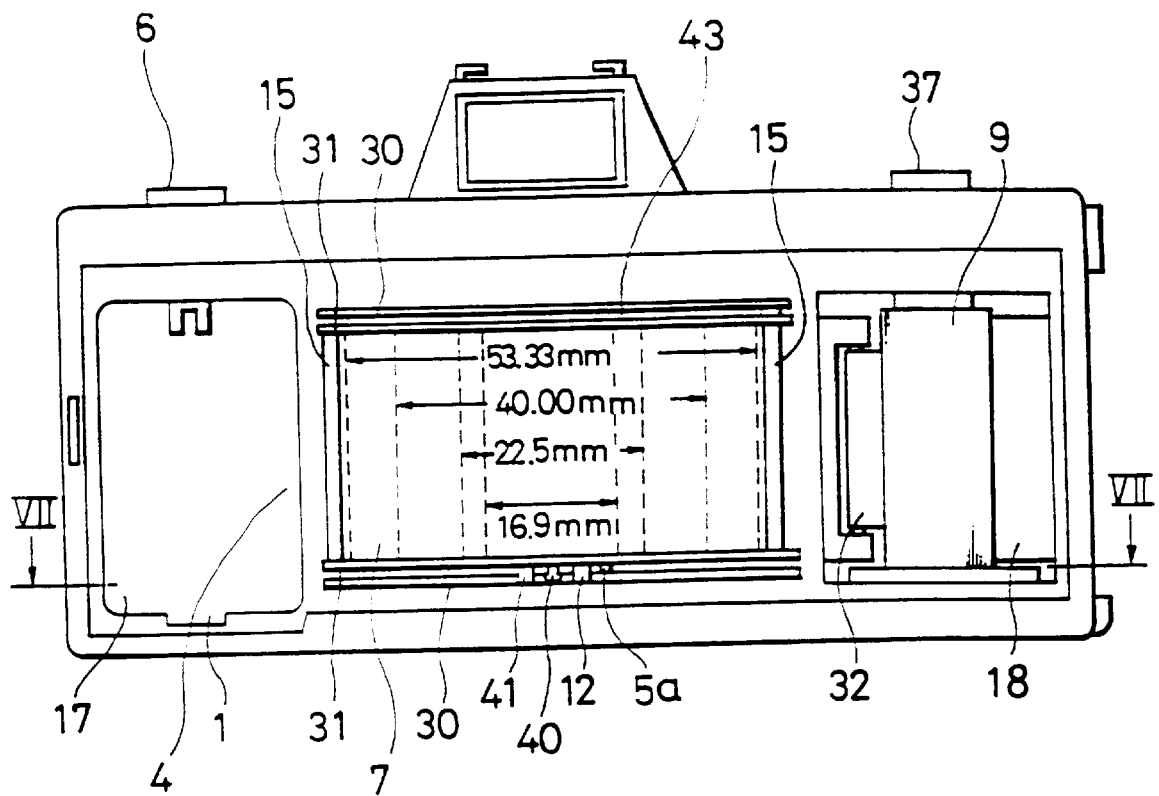
FIG. 5 is a rear elevational view of a photographic camera with a rear lid removed according to an embodiment of the present invention.
Figure 6:
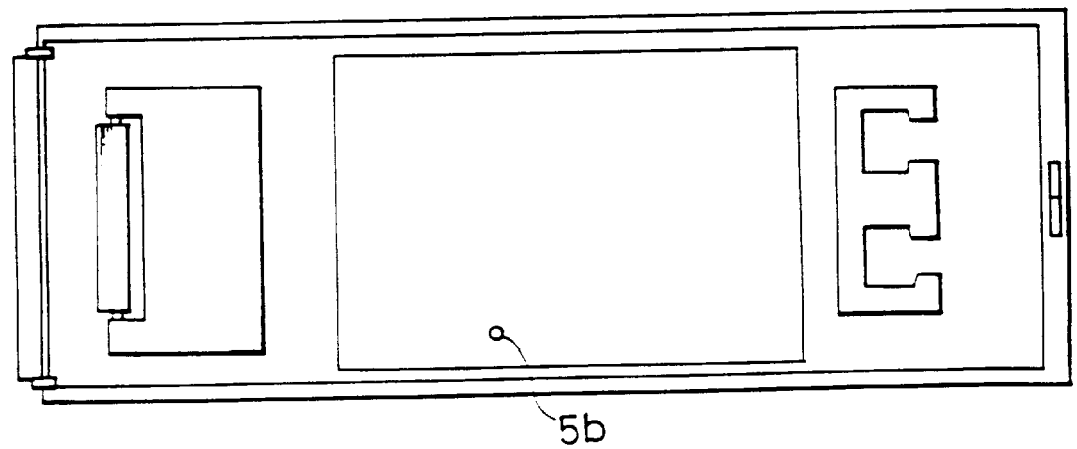
FIG. 6 is an elevational view of an inner surface of the rear lid of the photographic camera of FIG. 5.

An embodiment of a photographic camera that can use the photographic film 1 shown in FIGS. 1, 2, 3A, and 3B is shown and described below with reference to FIGS. 5 through 8 and 10. FIG. 5 is a rear elevational view of a photographic camera with a rear lid or cover removed. The lid is shown in FIG. 6. The photographic camera has a dark box 4 including a cartridge housing 17 for housing a film cartridge 16, which is of a known structure, an exposure opening 7 near the cartridge housing 17 and through which the photographic film 1 can be exposed to light passing through a camera lens, aperture, and shutter, not shown in FIG. 5, and a film housing 18 for housing the photographic film 1 after it has been exposed.

The photographic film 1 that is unwound from the film cartridge 16 housed in the cartridge housing 17 is fed over the exposure opening 7 while being transversely limited in motion by upper and lower respective pairs of film guides 30, 31, and is then moved into the film housing 18 after being exposed.

Figure 8:
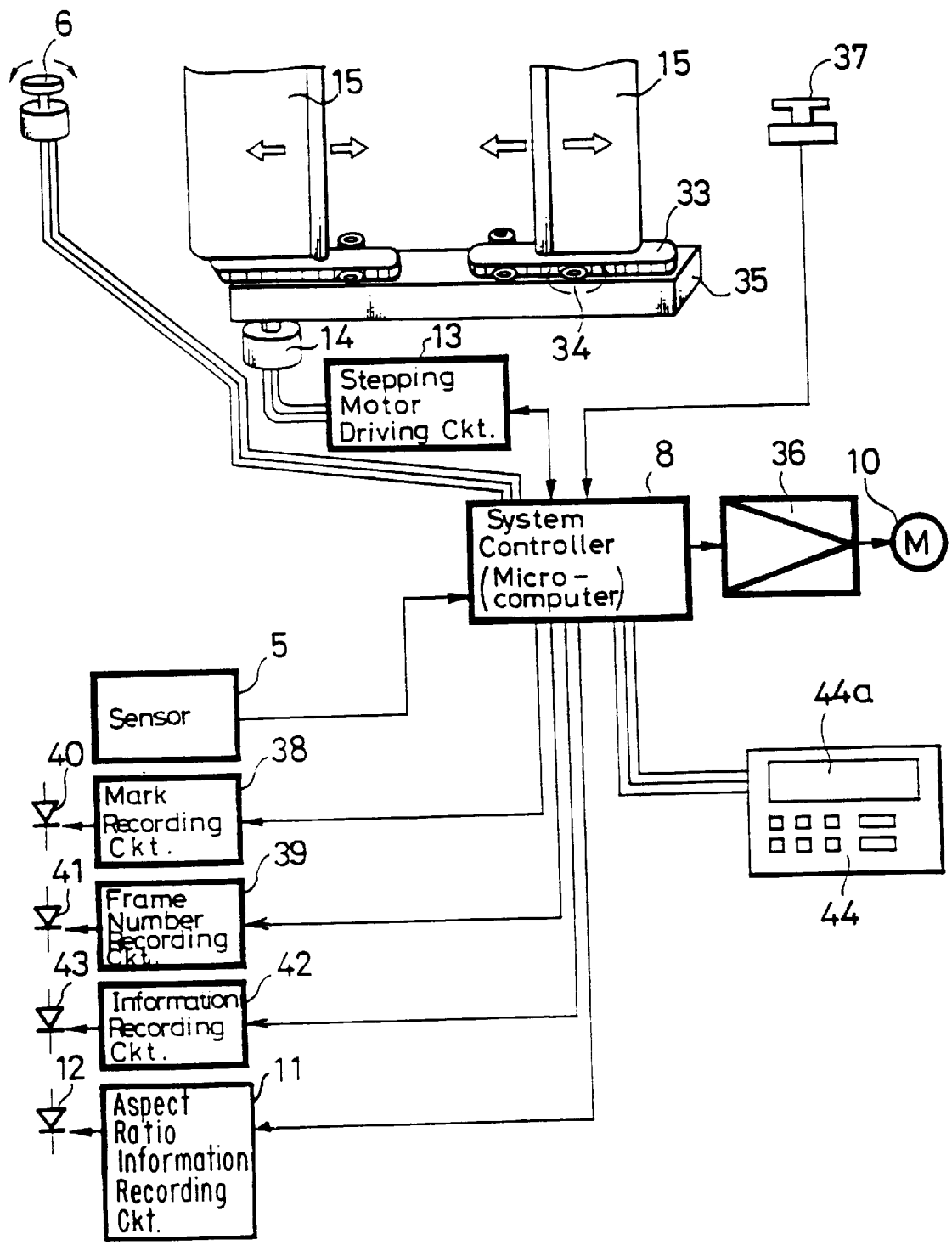
FIG. 8 is a block diagram of a control system for a photographic camera according to the present invention using the film cartridges of FIGS. 3A and 3B.

The film housing 18 has a guide roller 32 for automatically setting or loading the photographic film 1, and a film takeup spool 9 rotatable by a motor, shown at 10 in FIG. 8, for winding the exposed photographic film 1 thereon.

The photographic camera has a light-emitting diode (LED) 5a positioned between the lower film guides 30, 31 for detecting the film position detecting holes 19, and a photodetector, shown at 5b in FIG. 6, disposed on a pressure plate of the rear lid and positioned in registry with the LED 5a across the photographic film 1. The photodetector 5b has a diameter of 1.5 mm, for example.

The LED 5a emits infrared radiation having a wavelength of 940 nm, which is different from the radiation wavelengths to which the photographic film 1 is sensitive. Referring to FIG. 8, the LED 5a and the photodetector 5b jointly make up a hole sensor 5 that applies an output signal to a counter in a system controller 8 that comprises a microcomputer. In this way, the system controller 8 can recognize the position of the photographic film 1 over the exposure opening 7. The LED 5a and the photodetector 5b may be alternatively replaced with a photocoupler that also comprises an LED and a photodetector but which are positioned in confronting relationship, as described hereinbelow.

Figure 9:
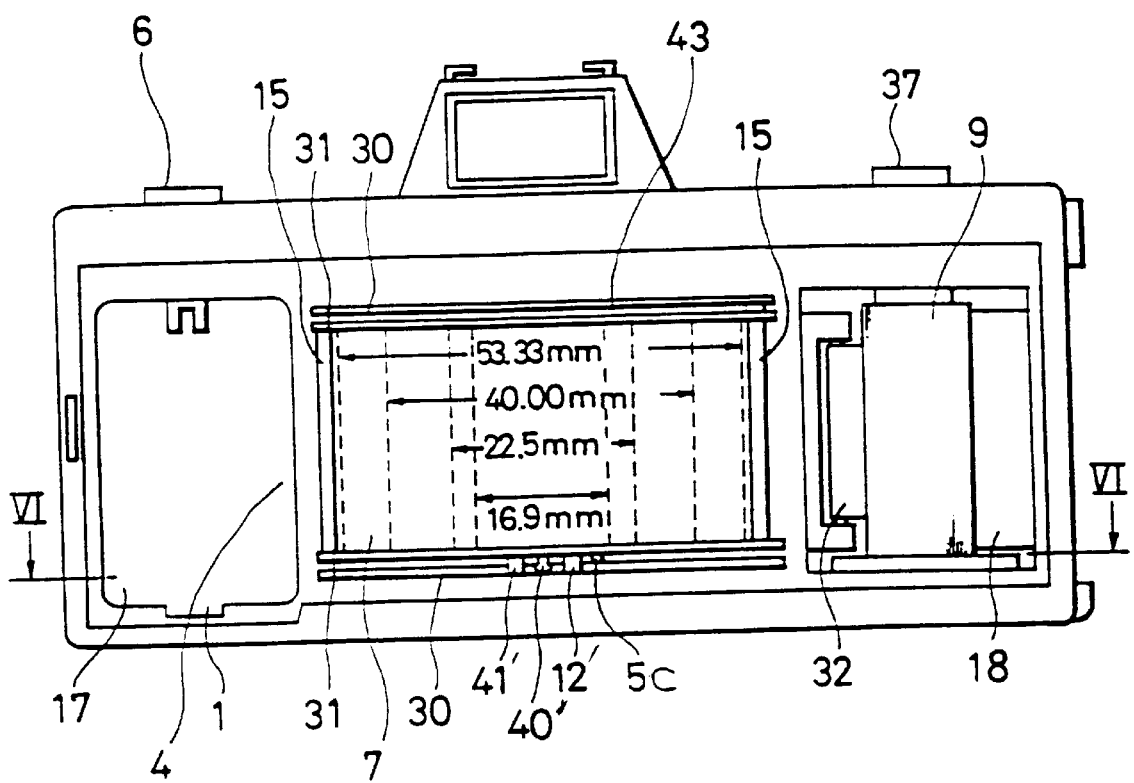
FIG. 9 is a rear elevational view of a photographic camera with a rear lid removed according to an embodiment of the present invention.
Figure 12:
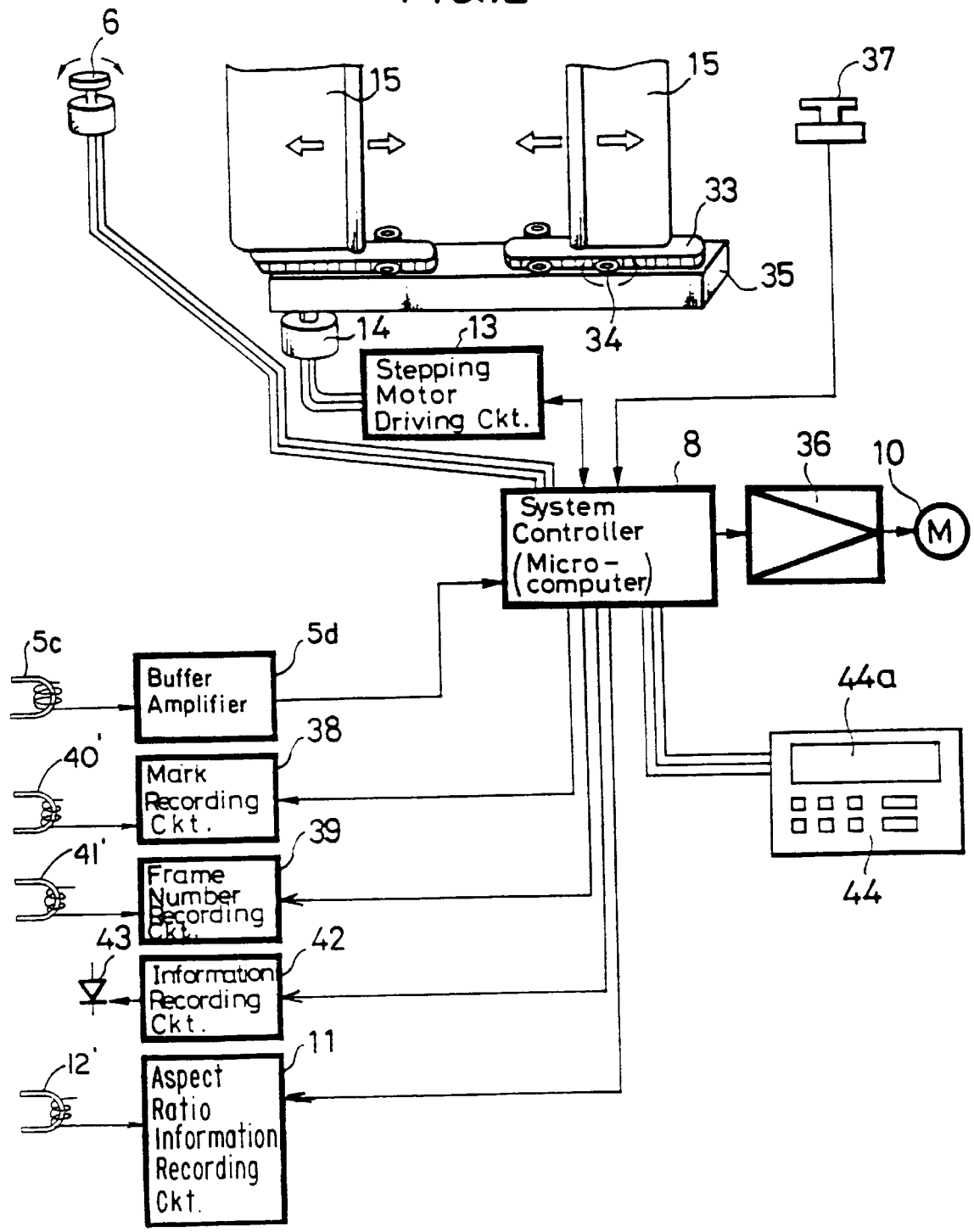
FIG. 12 is a block diagram of a control system for a photographic camera according to an embodiment of the present invention using the film cartridges of FIGS. 4A and 4B.

Alternatively, as shown in FIGS. 9 and 12, the LED 5a can be replaced by a magnetic head 5c that operates to sense magnetic marks 19', shown in FIGS. 4A and 4B, on the marginal edge area 19" of the photographic film 1.

In FIG. 5, the exposure area opening 7 has its size defined by left and right movable masks 15 that are laterally movable over the width of the exposure opening 7 from opposite sides thereof. The size of the exposure opening 7 in the longitudinal direction of the photographic film 1 can selectively be changed to four different dimensions of 53.33 mm, 40.00 mm, 22.5 mm, and 16.90 mm as indicated by the four pairs of broken lines in FIG. 5.

Figure 7:
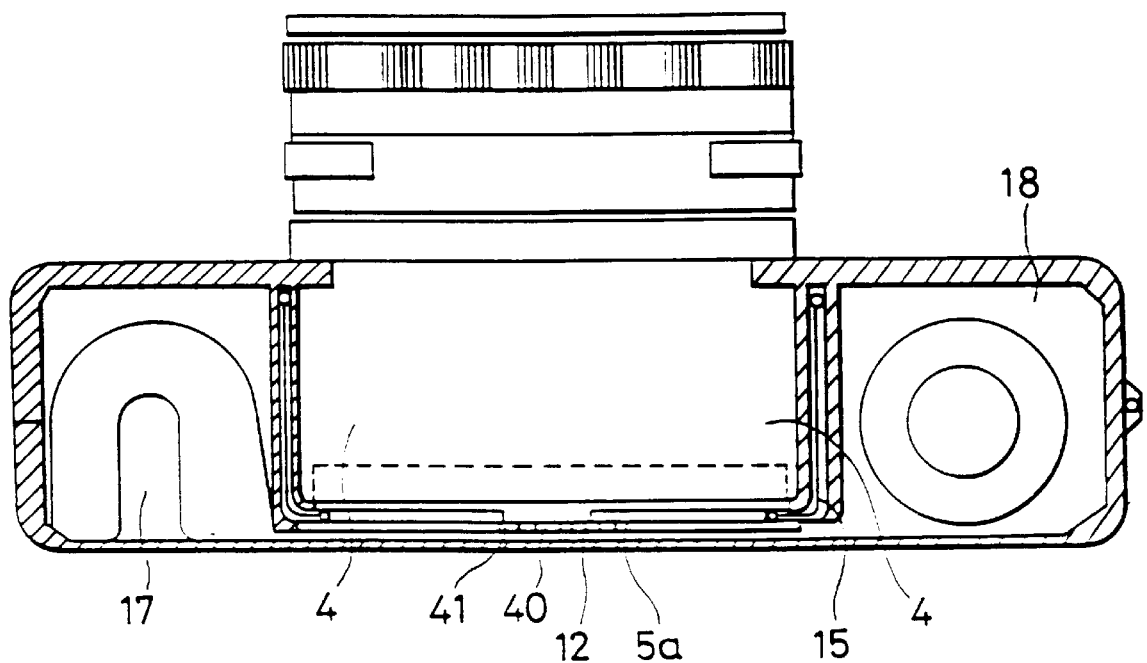
FIG. 7 is a cross-sectional view taken along line VII—VII of FIG. 5.
Figure 10:
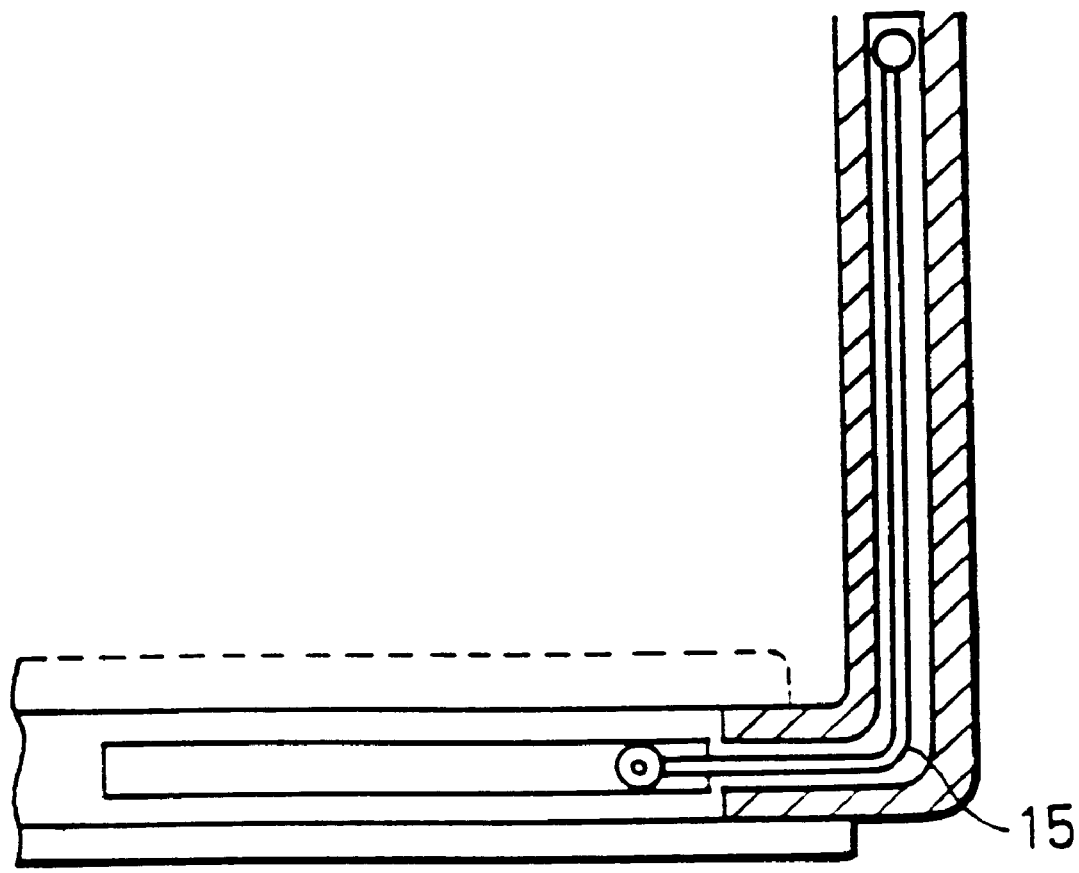
FIG. 10 is an enlarged fragmentary view of a portion of the camera shown in FIG. 7.

As shown in FIGS. 7 and 10, the left and right movable masks 15 are retractable into left and right side walls, respectively, that are positioned on opposite sides of the exposure opening 7 and extend substantially perpendicularly to the photographic film 1 as it extends over the exposure opening 7. As shown in FIG. 8, two linear toothed bars 33 are attached to the respective lower edges of the movable masks 15 and held in mesh with respective drive feed gears 34 of a gearbox 35, much like a rack and pinion assembly. When the feed gears 34 of the gearbox 35 are driven to rotate the linear toothed bars 33, the movable masks 15 are linearly moved over the exposure opening 7.

As shown in FIGS. 5, 8, and 9, the photographic camera has an aspect ratio setting switch 6 which can be manually turned by a user of the camera to produce a command signal indicative of a selected aspect ratio, which is one of the aspect ratios described above in Table 1. When the user selects an aspect ratio using the aspect ratio setting switch 6, the aspect ratio setting switch 6 applies a command signal to the system controller 8, which then supplies a control signal to achieve the desired aspect ratio through a stepping motor driving circuit 13 to a stepping motor 14. The stepping motor 14 is energized to rotate the feed gears 34 to move the movable masks 15. At the same time that the movable masks 15 move, the hole sensor 5 produces and supplies a detected film position signal to the system controller 8, which processes the supplied film position signal to generate a second control signal. The system controller 8 then supplies the second control signal through an amplifier 36 to a motor 10 that rotates the film spool 9 to take-up the photographic film 1 over a predetermined length.

At this time, the length over which the photographic film 1 is driven corresponds to a distance that is determined by the aspect ratio setting switch 6. Feeding of the photographic film 1 is described below with reference to FIGS. 11A through 11E, which show examples in which the hole pitch is 6.28 mm and the photographic film 1 is to be exposed in an HDTV-matched full-picture size of 30 mm×53.3 mm and an NTSC-matched full-picture size of 30 mm×40 mm.

FIG. 11A shows a portion of the photographic film 1 as it is exposed in successive NTSC-matched full frames. When the photographic film 1 is fed for seven pitches of the holes 19, a frame area of 30 mm×40 mm is made available for exposure through the exposure opening 7. To switch from an NTSC-matched full-picture size to an HDTV-matched full-picture size, the photographic film 1 is fed for eight pitches of the holes 19, as shown in FIG. 11B, to make a frame area of 30 mm ×53.3 mm available for exposure through the exposure opening 7. To expose the photographic film 1 in successive HDTV-matched full frames, the photographic film 1 is fed for nine pitches of the holes 19, as shown in FIG. 11C, to make a frame area of 30 mm×53.3 mm available for exposure through the exposure opening 7. To switch from an HDTV-matched full-picture size to an NTSC-matched full-picture size, the photographic film 1 is fed for eight pitches of the holes 19, as shown in FIG. 11D, to make a frame area of 30 mm×40 mm available for exposure through the exposure opening 7.

To change picture sizes, the system controller 8 controls the motor 10 as follows: when switching from an NTSC-matched full-picture size to an HDTV-matched full-picture size, the photographic film 1 is first driven for seven pitches of the holes 19 and is then driven for one additional hole pitch. When switching from an HDTV-matched full-picture size to an NTSC-matched full-picture size, the photographic film 1 is first driven forward for nine pitches of the holes 19 and is then driven backward for one pitch.

When changing picture sizes, the photographic film 1 may be driven for a different distance or a different number of pitches, such as ten pitches of the holes 19, as shown in FIG. 11E. FIG. 11E shows the photographic film 1 being constantly fed for a length equal to ten pitches of the holes 19. If the film cartridge can accommodate an increased length of film and the film can be used to record extra length frames, this constant length feeding approach is suitable for combinations of an HDTV-matched full-picture format and an NTSC-matched full-picture format along the length of the film. This constant length feeding can be also used with photographic film as shown in FIGS. 11F and 11G.

As illustrated in FIGS. 11F, 11G, and 11H, the distance between the holes 19 in these three figures corresponds to ten pitches of the holes 19 in FIG. 11A. FIG. 11F shows a photographic film 1 as it is exposed in successive NTSC-matched full-picture sizes. An aspect ratio information signal 12a is recorded at a center region of the pitches between the holes 19. To switch from an NTSC-matched full-picture size to an HDTV-matched full-picture size, the photographic film 1 is fed for one pitch, as shown in FIG. 11G. An aspect ratio information signal 12a is then recorded at a position which is separated by a constant distance from one of the holes 19 and, in this embodiment, that distance is about 6.28 mm. The aspect ratio information signal 12a may be detected as film information by the printer using the known positional relationship between the holes 19 and the aspect ratio information signal 12a. FIG. 11H shows a photographic film 1 as it would be exposed when switching from an HDTV-matched full-picture size to the NTSC-matched full-picture size. In FIG. 11H the aspect ratio information signal 12a and the NTSC and HDTV frames 3 are recorded at a center region of the pitches between successive holes 19.

FIGS. 11H, 11I, and 11J all show other recording formats or sizes for the aspect ratio information signal 12a. These three formats or sizes can be used in both film feeding directions of a camera. For example, one camera may feed a photographic film 1 from a cartridge housing to a film housing after exposing a frame 3 of a subject on the film 1. Another camera may feed the film 1 back from the film housing to the cartridge housing after exposing the film 1. For both types of cameras, an aspect ratio information signal 12a and a frame 3 can be exposed at a position that is a constant distance from the holes 19 on both sides of the frame 3.

FIGS. 11I and 11J show a combination of two different hole pitches which consist of a short distance and a long distance. FIG. 11I shows a format where an aspect ratio information signal 12a is exposed on a right side of a frame 3 and is a known constant distance away from the holes 19 on both sides. FIG. 11J shows a format where an aspect ratio information signal 12a is exposed on a left side of a frame 3 and is a constant distance away from the holes 19 on both sides.

As shown in FIGS. 11A through 11J, the system controller 8 of the photographic camera controls feeding of the photographic film 1 such that the photographic film 1 will not be exposed in overlapping frames, even when different frame sizes are successively exposed.

The procedure described in relation to FIGS. 11A through 11J applies equally to the magnetic marks 19' present on the photographic film 1 shown in FIGS. 4A and 4B.

FIGS. 1 and 2 illustrate a photographic film 1 whose effective exposure areas have been exposed in frames 3 of different aspect ratios or sizes. In FIG. 1, the photographic film 1 has been exposed in an HDTV-matched full-picture size, having a width of 30 mm, a length of 53.3 mm, and an aspect ratio of 9:16, and in an NTSC-matched full-picture size, having a width of 30 mm, a length of 40 mm, and an aspect ratio of 3:4. The holes 19 defined along an upper marginal edge of the photographic film 1 have a pitch of 5.25 mm.

In FIG. 2, the photographic film 1 has also been exposed in an HDTV-matched full-picture size and an NTSC-matched full-picture size, however, unlike FIG. 1, the holes 19 defined in the upper marginal edge of the photographic film 1 have a pitch of 6.28 mm. In FIG. 2, one frame of an HDTV-matched full-picture size corresponds to nine pitches of the holes 19, and one frame of an NTSC-matched full-picture size corresponds to seven pitches of the holes 19. Since these pitches are odd-numbered, a hole 19 may be positioned in alignment with the center of a frame, so that the center of the frame can easily be detected.

As shown in FIGS. 5 and 8, the photographic camera has a shutter release button 37. When the shutter release button 37 is depressed, the system controller 8 controls the size of the exposure area and supplies a control signal to a mark recording circuit 38 for recording a central mark, a so-called effective exposure area position signal, indicative of the center of a frame 3, and the system controller 8 also supplies a control signal to a frame number recording circuit 39 for recording a frame number signal containing information such as a frame number and other film information. The mark recording circuit 38 energizes an LED 40 positioned at lower film guides 30, 31 for recording a central mark 40a, shown in FIGS. 1 and 2, representing the center of an exposed frame 3. The frame number recording circuit 39 energizes an LED 41 positioned at the lower film guides 30, 31 for recording a frame number signal 41a containing a frame number and other film information, shown in FIGS. 1 and 2, representing the frame number of the exposed frame 3. The frame number signal 41a can be recorded such that it agrees with an actual frame number.

Alternatively, as shown in FIG. 12, in place of an LED 40 a magnetic head 40' can be employed to record the central mark 40a in a marginal area 19" of the film 1. Similarly, the frame information, namely the frame number signal 41a, can be recorded using another magnetic head 41'.

The system controller 8 also supplies a control signal to an aspect ratio information recording circuit 11 for recording an aspect ration information signal to be used by a photographic printer as one of the film information signals. The aspect ratio information recording circuit 11 energizes an LED 12 positioned at lower film guides 30, 31 for recording an aspect ratio information signal 12a, as shown in FIGS. 1 and 2.

Alternatively, as shown in FIG. 12, in place of an LED 12 a magnetic head 12' can be employed to record the aspect ratio information signal 12a in a marginal area 19" of the film 1.

A magnetic head 5c, shown in FIGS. 9 and 12, that senses magnetic marks 19' on the photographic film 1, shown in FIGS. 4A and 4B, is connected to a system controller 8 through a buffer amplifier 5d or a similar playback amplifier.

The LED 12, shown in FIG. 8, may be composed of four LED elements which are selectively energized to record one of a plurality of aspect ratio information signals 12a, which represent an aspect ratio set by an aspect ratio setting switch 6. Various aspect ratio information signals 12a are shown by way of example in Table 2 below and are known as aspect signals.

TABLE 2

| Picture Size | Aspect ratio information signal 12a |
| --- | --- |
| HDTV-matched full-picture | ‖‖ |
| NTSC-matched full-picture | ‖ |
| NTSC-matched half-picture | ‖ |
| HDTV-rnatched half-picture | ǀ |

The central mark 40a and the aspect ratio information signal 12a supply information regarding frame position and picture size to an automatic printer, described hereinbelow, for controlling the automatic printer when exposed and processed film is printed.

While picture sizes can be recognized by measuring the distances between adjacent central marks 40a when the exposed film is printed, the processing speed of the automatic printer can be increased by using the aspect ratio information signal 12a.

At the same time that the photographic film 1 is exposed, the system controller 8 supplies an information signal to an information recording circuit 42 for recording desired information. The information recording circuit 42 energizes an LED 43 positioned at upper film guides 30, 31 for recording such information 43a on a lower marginal edge of the photographic film 1, as shown in FIGS. 1 and 2. The information 43a may be information that is supplied from a camera lens and the camera itself upon exposure or it may consist of an exposure date, a name, an exposure condition, or other information that a user has entered through an input device 44, such as a keypad, located on an outer surface of a rear lid of a camera. The amount of information 43a, that is, the number of characters that can be recorded, is dependent upon picture size, and is displayed on a display panel 44a of the input device 44, as shown in FIGS. 8 and 12. The LED 43 has a number of LED elements that are selectively energized depending on the picture size.

An analysis has been made to determine the optimum position where the information 43a should be recorded and the optimum position where the holes 19 or magnetic marks 19' are defined from the standpoints of user convenience and a psychological effect that those positions have on the user. The results of the analysis are as follows:

(1) If marginal edges outside of the effective exposure area of the film are available as a band for recording user's information, then the information should more preferably be positioned on the lower marginal edge of the print paper, rather than on the upper marginal edge.

(2) A study of the developing and printing processes in processing laboratories indicates that in many cases information about the film itself is printed on film negatives such that the film information is positioned on the upper marginal edge of the print paper. It is preferable not to mix the film information and the band for recording user's information.

From the above analysis, it is preferable to position the film position-detecting holes 19 upwards relative to the effective exposure area of the film when it is exposed.

As described above with reference to FIGS. 5 through 8, the photographic camera has detecting means 5a, 5b for detecting the feeding of the photographic film 1, a film control system 8, 9, 10 for controlling the distance by which the photographic film 1 moves and for driving the photographic film 1 for a length corresponding to the width of the selected exposure opening 7, based on a detected signal from the detecting means 5a, 5b, and for controlling a signal recording device 8, 11, 12, 38, 39, 40, 41, 42, 43 disposed near the exposure opening 7 for recording a signal indicative of the position of the exposure opening 7 on the photographic film 1 when the photographic film 1 is exposed through the exposure opening 7.

After the photographic film 1 is exposed using the photographic camera, the processed photographic film 1 bears control signals that are recorded in a signal recording area 21, shown in see FIG. 1, thereof and that will be used when the photographic film 1 is printed. Therefore, even if the developed photographic film 1 contains frames of different picture sizes, it can be automatically printed by an automatic printer without requiring individual adjustment.

The photographic camera also has a film control system 8, 9, 10 for controlling the feeding or driving of the photographic film 1, and an opening control system 8, 13, 14, 15 for varying the width of the exposure opening 7 along the photographic film 1. At least when the width of the exposure opening 7 changes from a smaller dimension to a larger dimension, the film control system 8, 9, 10 drives the photographic film 1 for a length corresponding to the selected width of the exposure opening 7.

Therefore, the width of the exposure opening 7 is variable, and the take-up or driving of the photographic film 1 is controlled depending on the width of the exposure opening 7. The photographic camera can expose the photographic film 1 successively in desired picture sizes which may differ one from another without adjacent frames overlapping each other.

As shown in FIG. 1, the photographic film 1 used in the photographic camera has a signal recording area 21 located between an effective exposure area 20 and a marginal edge thereof for magnetically or optically recording control signals, which will be used when the photographic film 1 is processed and printed. The film 1 has holes 19 or magnetic marks 19' defined in an upper marginal edge area thereof between the effective exposure area 20 and the marginal edge for detecting the distance by which the photographic film 1 has been moved.

According to the above embodiment, the film 1 is fed a predetermined length by the motor 10 which is controlled by the system controller 8, and when a predetermined frame of the film 1 is exposed using the shutter release button 37, an aspect ratio information signal 12a and a frame number signal 41a are recorded in the marginal area of the film 1. The aspect ratio information signal 12a and the frame number signal 41a are utilized for automatic printing, as explained below.

Figure 13:
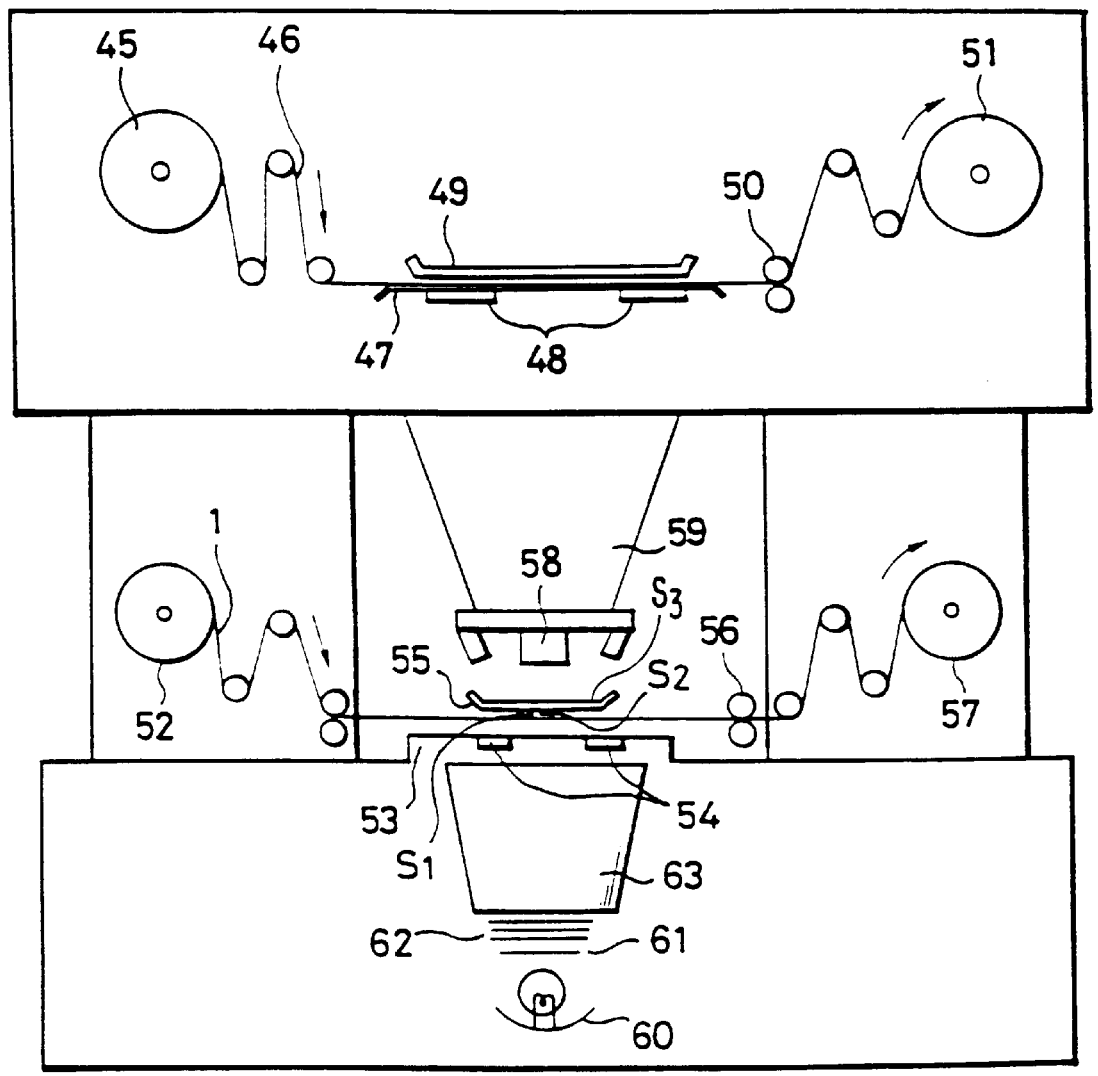
FIG. 13 an elevational view of an automatic printer for printing on photosensitive paper processed film that was exposed using a photographic camera according to an embodiment of the present invention.

As shown in FIG. 13, an automatic printer for automatically printing processed photographic film 1 that has been exposed using a camera as described above has a printer body that supports a paper supply reel 45 for supplying the sensitized print paper 46, a paper deck or platen 47 for supporting the print paper 46 supplied from the paper supply reel 45, a variable mask 48 for determining the size of a print paper segment on which an image is to be printed, a paper holder plate 49 for holding the print paper 46 down against the paper deck 47, a paper feed or drive roller 50 for driving the print paper 46, and a paper takeup reel 51 for winding the exposed print paper 46.

The printer body of the automatic printer also supports a film supply reel 52 for supplying the processed photographic film 1, a film deck or platen 53 for supporting the photographic film 1 supplied from the film supply reel 52, a negative-carrier variable slit 54, a negative holder plate 55 for positioning the negative against the film deck 53, a film feed or drive roller 56 for driving the photographic film 1, a film takeup reel 57 for winding the exposed and processed photographic film 1, a lens 58 positioned above the negative holder plate 55, a bellows 59 supporting the lens 58 and positioned below the paper deck 47, a lamp 60 disposed below the film deck 53, a black shutter 61 positioned above the lamp 60, a filter assembly 62 composed of yellow, magenta, and cyan (Y, M, C) filters, and a diffusion box 63 disposed between the filter assembly 62 and the film deck 53.

The negative holder plate 55 supports an aspect signal sensor S1 for detecting the aspect ratio information signal 12a recorded on the photographic film 1 and a frame center sensor S2 for detecting a central mark 40a recorded on the photographic film 1 for indicating the center of a frame.

Upon detection of the central mark 40a of a frame 3 with the frame center sensor S2, the film drive roller 56 is controlled to drive the film 1 to align the frame center with the center of the negative-carrier variable slit 54 in order to print continuously. The variable mask 48 and the negative-carrier variable slit 54 are controlled based on the aspect ratio information signal 12a detected by the aspect signal sensor S1.

Figure 18A:
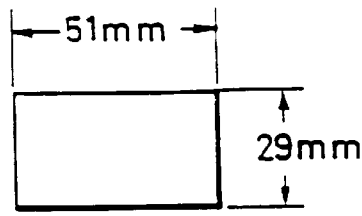
FIGS. 18A and 18B illustrate relative aspects of negative-carrier variable slits in an automatic printer according to an embodiment of the present invention.
Figure 18B:
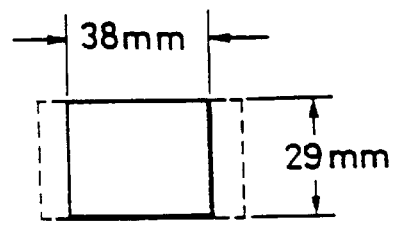
Figure 19A:
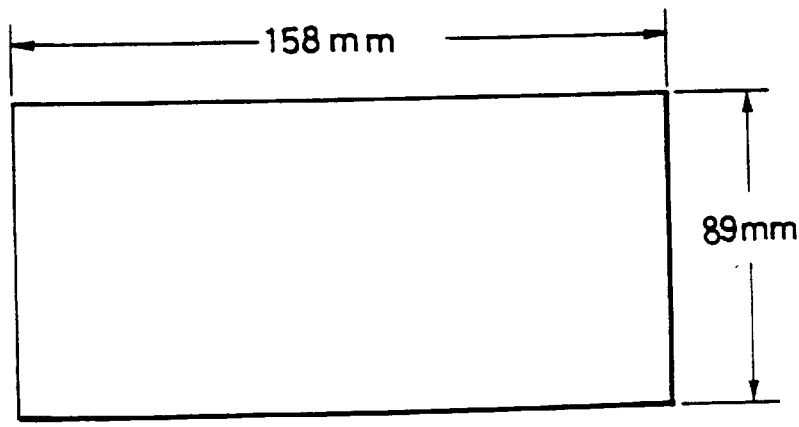
FIGS. 19A and 19B are representations showing the relative aspects of variable masks in the automatic printer of the present invention.
Figure 19B:
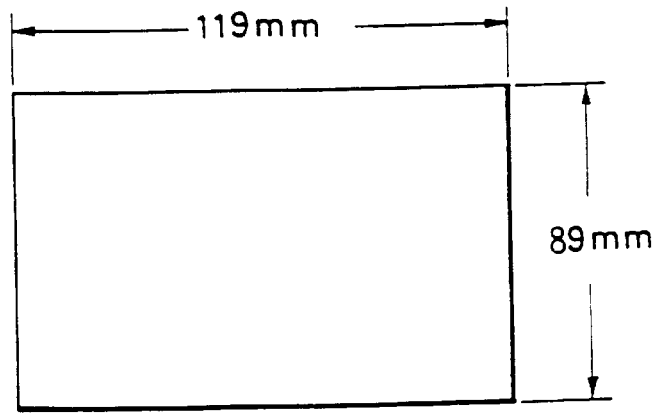

If the picture size is an HDTV-matched picture size, for example, the negative-carrier variable slit 54 is set to dimensions as shown in FIG. 18A, and the variable mask 48 is set to dimensions as shown in FIG. 19A. If the picture size is an NTSC-matched picture size, for example, the negative-carrier variable slit 54 is set to dimensions as shown in FIG. 18B, and the variable mask 48 is set to dimensions as shown in FIG. 19B.

Figure 14:
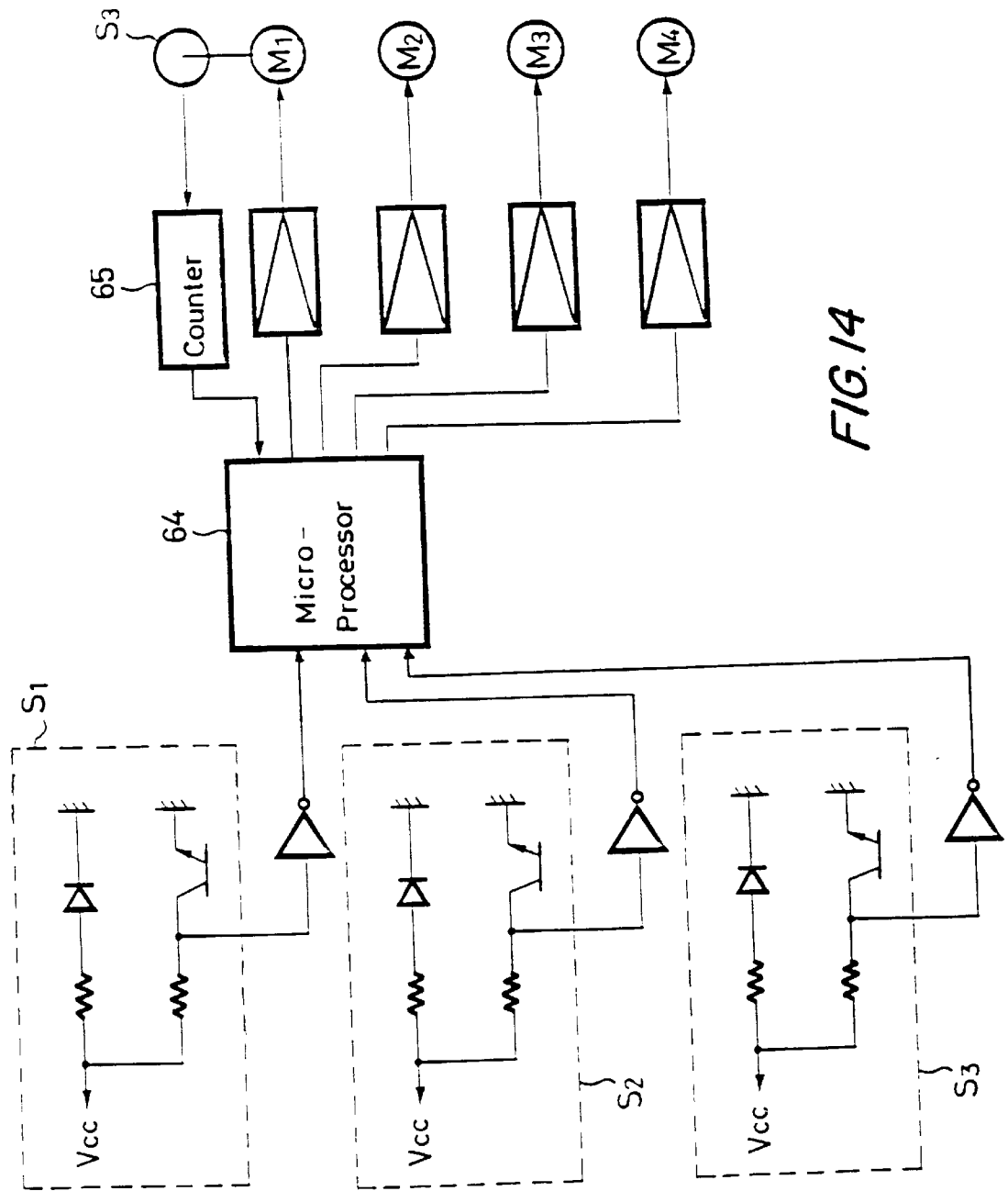
FIG. 14 is a block diagram of a control system used in the automatic printer shown in FIG. 13.

A control system for the automatic printer is shown in FIG. 14, in which the aspect signal sensor S1 and the frame center sensor S2 respectively comprise photocouplers for detecting the aspect ratio information signal 12a and the central mark 40a, respectively, that are recorded in the marginal edge area of the photographic film 1.

Figure 15:
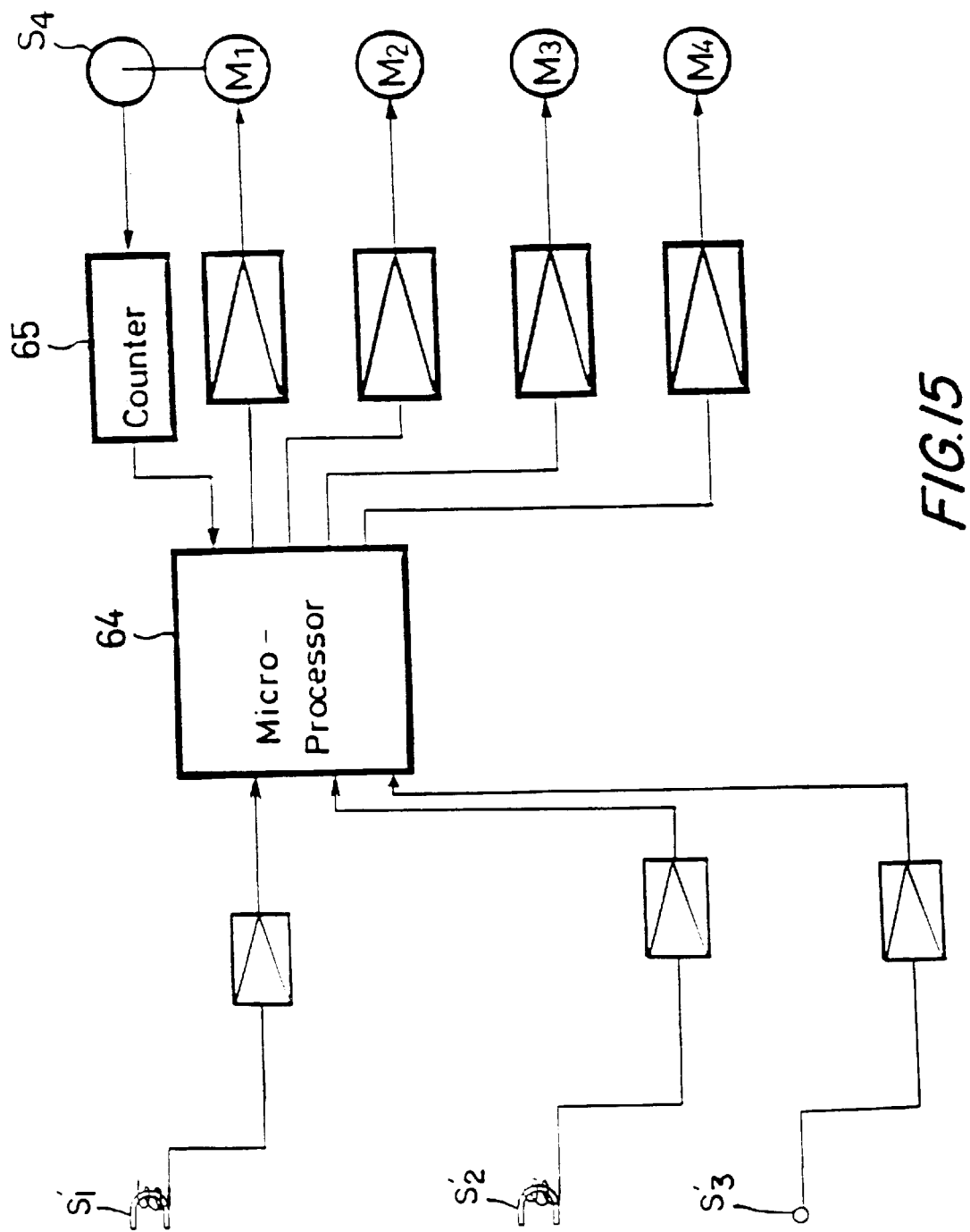
FIG. 15 is a block diagram of a control system for an automatic printer according to an embodiment of the present invention.

Alternatively, the sensors S1 and S2 may be comprised of respective magnetic heads S1' and S2', as shown in FIG. 15, that read an aspect ratio information signal 12a and a central mark 40a that are magnetically recorded in the marginal area 19" of the film.

The frame center is determined based on the central mark 40a detected by the frame center sensor S2, and the picture size of the frame 3, whose frame center is determined by a microprocessor 64 of the control system is based on the aspect ratio information signal 12a read by the aspect signal sensor S1 before the central mark 40a is detected by the frame center sensor S2. Then, the microprocessor 64 controls a mask size drive motor M3 to actuate the variable mask 48 to conform with the determined print size. At the same time, the microprocessor 64 controls a negative-carrier variable slit drive motor M2 to actuate the negative-carrier variable slit 54.

Based on the aspect ratio information signal 12a read by the aspect signal sensor S1, the microprocessor 64 controls a film feed motor M1 to rotate the film feel roller 56 for feeding the photographic film 1 for a predetermined length. At the same time, the microprocessor 64 controls a paper feed motor M4 to rotate the paper feed roller 50 to feed the print paper 46 for a predetermined length.

Figure 16C:
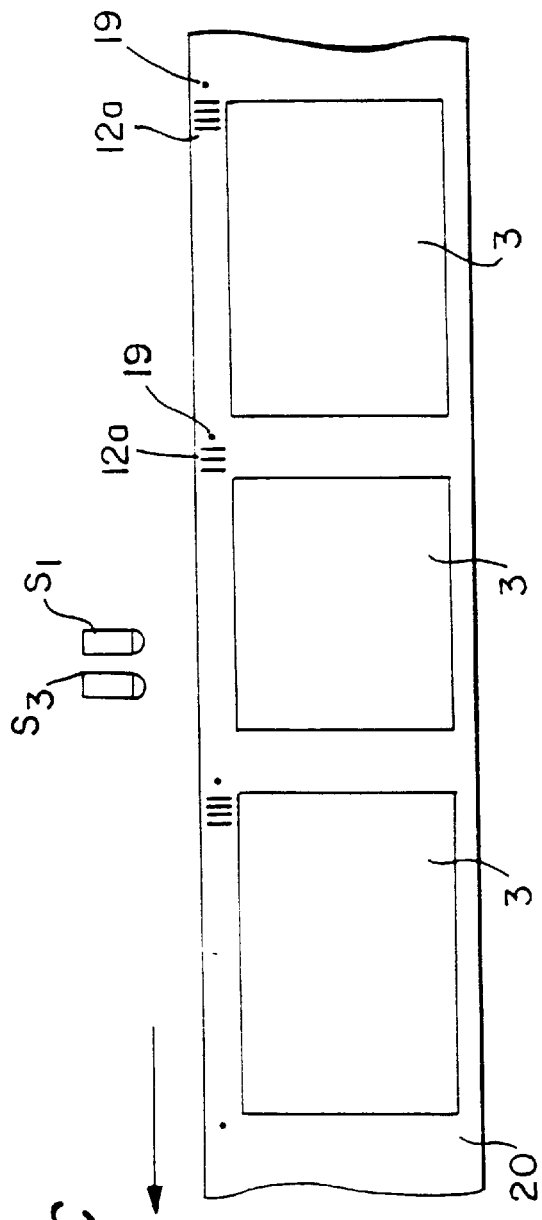
Figure 16D:
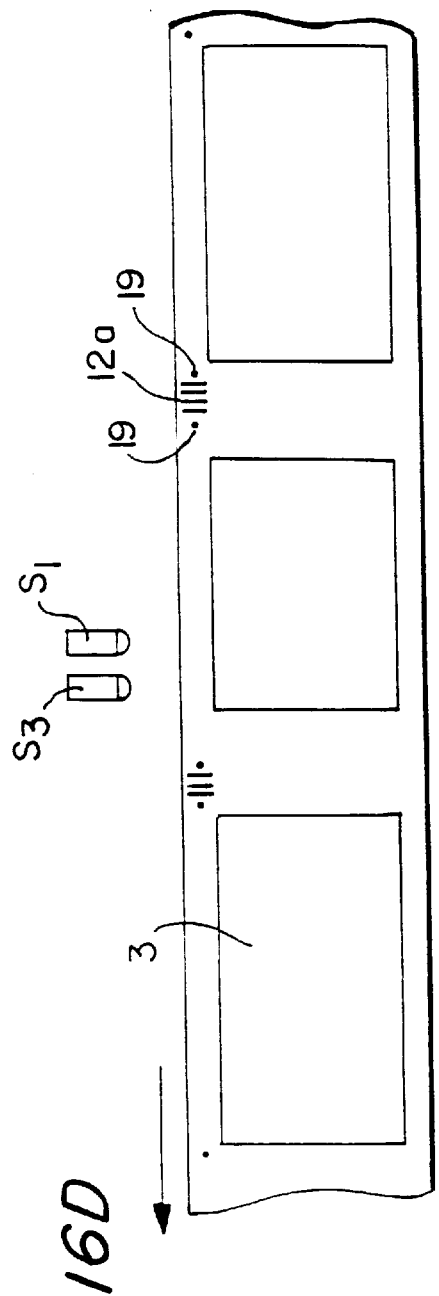

FIGS. 16A and 16B show the relationship between the photographic film 1, the frame center sensor S2, and the aspect signal sensor S1 in an automatic printer according to an embodiment of the present invention. FIGS. 16C and 16D show the relationship between the photographic film 1, the hole sensor S3, and the aspect signal sensor S1 in an automatic printer according to another embodiment of the present invention for film 1 using a format shown in FIGS. 11F through 11J. When the photographic film 1 is driven in the direction indicated by the arrow A in FIG. 16A, the aspect ratio information signal 12a is detected by the aspect signal sensor S1 before the frame 3 is positioned, and an aspect signal sensor S1 output signal is used for controlling the driving of the photographic film 1, the negative-carrier variable slit 54, and the variable mask 48. The signal from aspect signal sensor S1 is processed by the microprocessor 64, which determines the picture size while the frame center of the frame 3 is determined by the frame center sensor S2 or by the hole sensor S3.

As shown in FIGS. 16A and 16B, the central mark 40a indicative of a frame center is recorded at each frame of the photographic film 1. For each frame, the aspect ratio information signal 12a is recorded ahead of the central mark 40a, and the frame number signal 41a is recorded behind the central mark 40a with respect to the direction in which the photographic film 1 is driven.

While the frame center sensor S2 and the aspect signal sensor S1 are shown as being located at substantially the same position, only the frame center sensor S2 should be positioned in alignment with the center of the negative-carrier variable slit 54 and the variable mask 48, and the aspect signal sensor S1 should be positioned on the film deck 53 at an entrance end thereof. This applies to the magnetic head sensors S1' and S2' as well.

As shown in FIGS. 16C and 16D, the aspect ratio information signal 12a is recorded for each frame of the photographic film 1. The aspect ratio information signal 12a and the frame 3 are located a constant distance away from a hole 19. Using the known relationship of the distance from the hole 19 to the aspect ratio information signal 12a and the frame 3, the frame center can be found. Thus, the size of the frame 3, whose center is determined by the microprocessor 64 of the control system, is based on the aspect ratio information signal 12a, which is read by the aspect signal sensor S1 before the hole 19 is detected by the hole sensor S3, as shown in FIGS. 13, 16C, and 16D. In FIG. 16D the aspect signal sensor S1 and the hole sensor S3 may have exchanged positions based on the control sequence of the microprocessor 64.

Figure 17A:
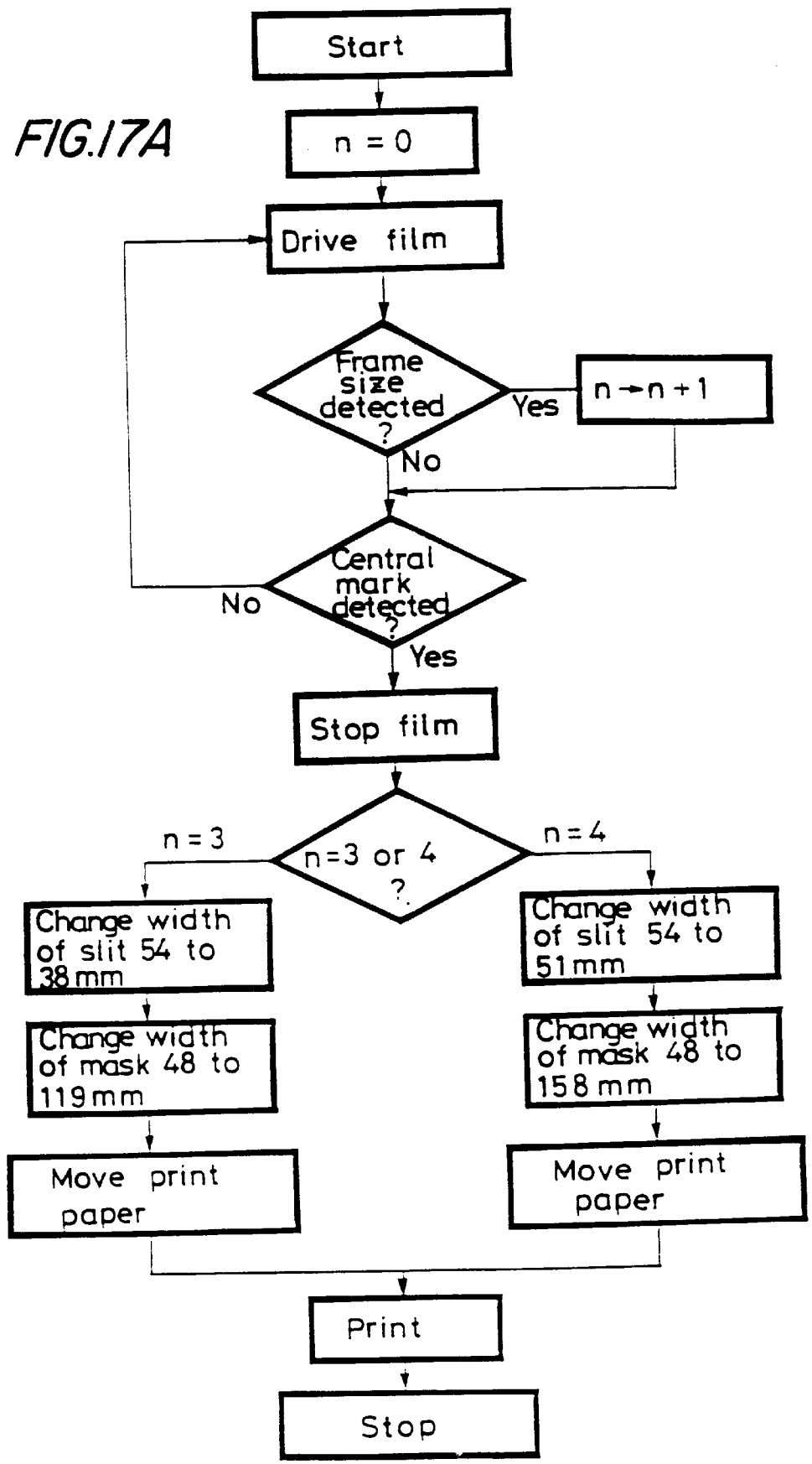
FIGS. 17A and 17B are flowcharts of a program that is executed by a microprocessor of the control system shown in FIG. 14.

FIG. 17A shows a control sequence of the microprocessor 64 for controlling the driving of the developed photographic film or negative 1 and the driving of the print paper 46. The negative-carrier variable slit 54 and the variable mask 48 are also controlled in this control sequence. The photographic film 1 is continuously driven and taken up until the central mark 40a is detected by the frame center sensor S2, at which point the photographic film 1 is stopped. Until the photographic film 1 is stopped, the aspect ratio information signal 12a is detected by the aspect signal sensor S1 and its number is counted.

If the aspect ratio information signal 12a represents "3", the width of the negative-carrier variable slit 54 is set to 38 mm, and the width of the variable mask 48 is set to 119 mm. Thereafter, the print paper 46 is moved, the photographic film 1 is printed, and then the control sequence is ended. The print paper 46 is moved for a distance corresponding to printed picture sizes which have predetermined aspect ratios, a blank surrounding the printed frames, and a cutting blank between the printed frames. Usually, a hole is defined in the cutting blank when the photographic film 1 is printed and serves as a positional signal for automatically cutting the print paper.

If the aspect ratio information signal 12a represents "4", the width of the negative-carrier variable slit 54 is set to 51 mm, and the width of the variable mask 48 is set to 158 mm. Thereafter, the print paper 46 is moved, the photographic film 1 is printed, and then the control sequence is ended.

If the aspect ratio information signal 12a represents "1" or "2", the widths of the negative-carrier variable slit 54 and the variable mask 48 are set in a similar manner as above. Thereafter, the print paper 46 is moved, the photographic film 1 is printed, and then the control sequence is ended.

Since the aspect ratio information signal 12a is recorded in the upper marginal edge portion of the photographic film 1, it is possible that it may be erroneously recognized as the central mark 40a. To avoid such an error, a negative feed sensor S4, shown in FIG. 14, for detecting the distance by which the photographic film 1 is fed is associated with the film feed motor M1, and the distance by which the photographic film 1 is fed is measured by a counter 65 whose count is fed back to the microprocessor 64. Since the width of the aspect ratio information signal 12a on the photographic film 1 can be detected by the distance by which the photographic film 1 is driven, the aspect ratio information signal 12a can be distinguished from the central mark 40a or the frame number signal 41a.

Figure 17B:
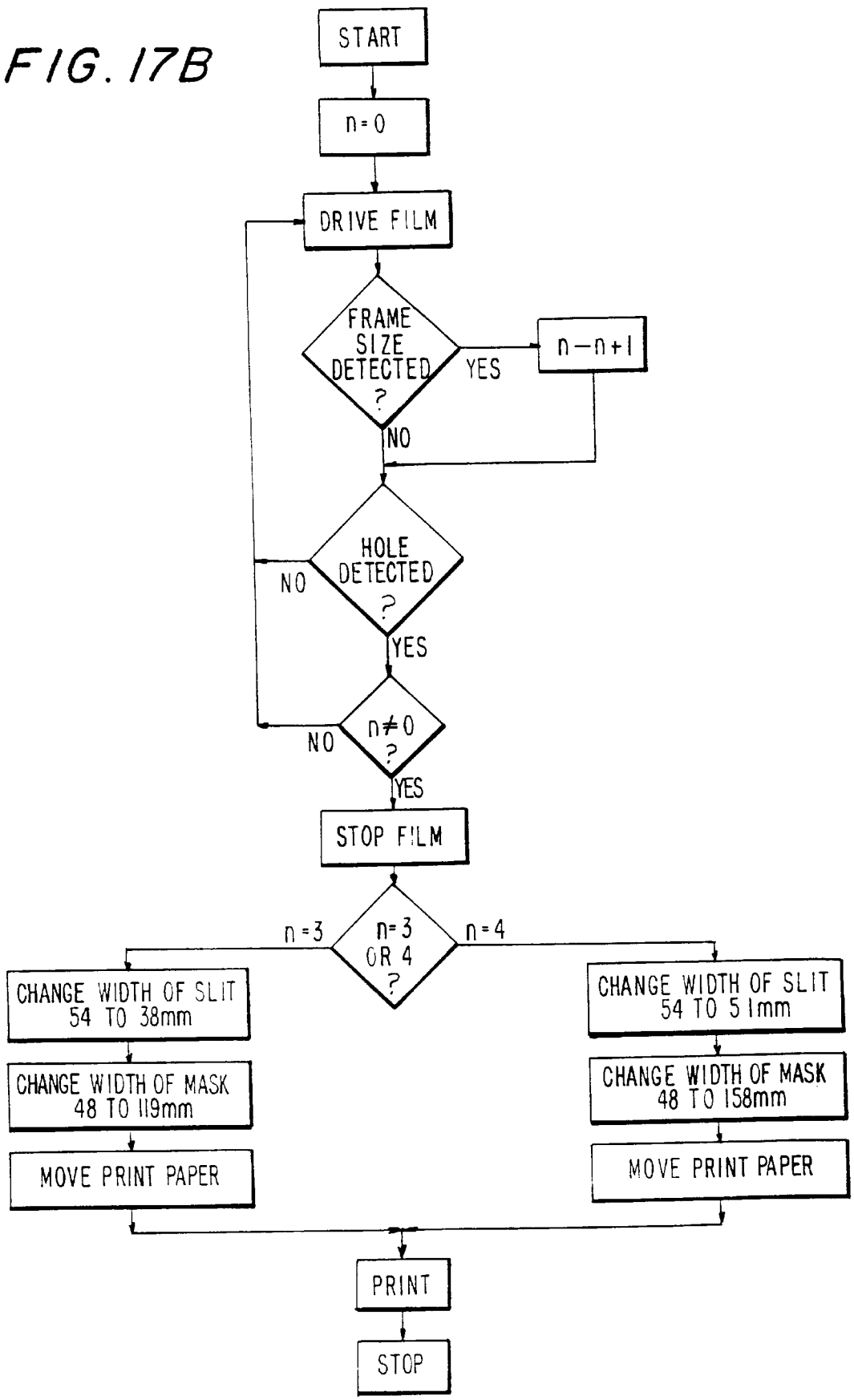

FIG. 17B shows a control sequence of the microprocessor 64 for the photographic formats shown in FIGS. 11F through 11J. This control sequence is used for the printer as shown in FIGS. 16C and 16D. The photographic film 1 is continuously fed until the hole 19 is detected by the hole sensor S3 and the aspect ratio information signal 12a is detected by the aspect signal sensor S1. Until the photographic film 1 is stopped, the aspect ratio information signal 12a is detected by the aspect signal sensor S1 and its number is counted. After the photographic film is stopped, the control sequence of the microprocessor 64 is as shown in FIG. 17A.

As described above with reference to FIGS. 13, 14, and 16A through 16D, the automatic printer has a film drive control device 65, 64, M1 for detecting a central mark 40a recorded in a marginal edge area between the effective exposure area 20 of the photographic film 1 and the marginal edge thereof to control the driving of the photographic film 1, and a printing opening width control device 54, 64, M2 for detecting an aspect ratio information signal 12a recorded in the marginal edge area to control the width of the printing opening along the photographic film 1.

The photographic film 1 has the central mark 40a and the aspect ratio information signal 12a recorded in a marginal edge area between the effective exposure area 20 of the photographic film 1 and the marginal edge thereof. After the aspect ratio information signal 12a has been detected, the central mark 40a is detected. The width of the film exposure opening along the photographic film 1, the width of the print paper exposure opening, and the distance by which the print paper 46 is driven are controlled based on the detected aspect ratio information signal 12a, and the distance by which the photographic film 1 is fed is controlled based on the detected central mark 40a.

Therefore, since the distance by which the photographic film 1 is driven is controlled based on the central mark 40a recorded in the marginal edge area of the photographic film 1, and the width of the printing opening, the width of the print paper exposure opening and the distance over which the print paper 46 is driven are controlled based on the aspect ratio information signal 12a recorded in the marginal edge area of the photographic film 1, the photographic film 1 can be automatically printed even for a succession of pictures of different sizes.

Figure 20:
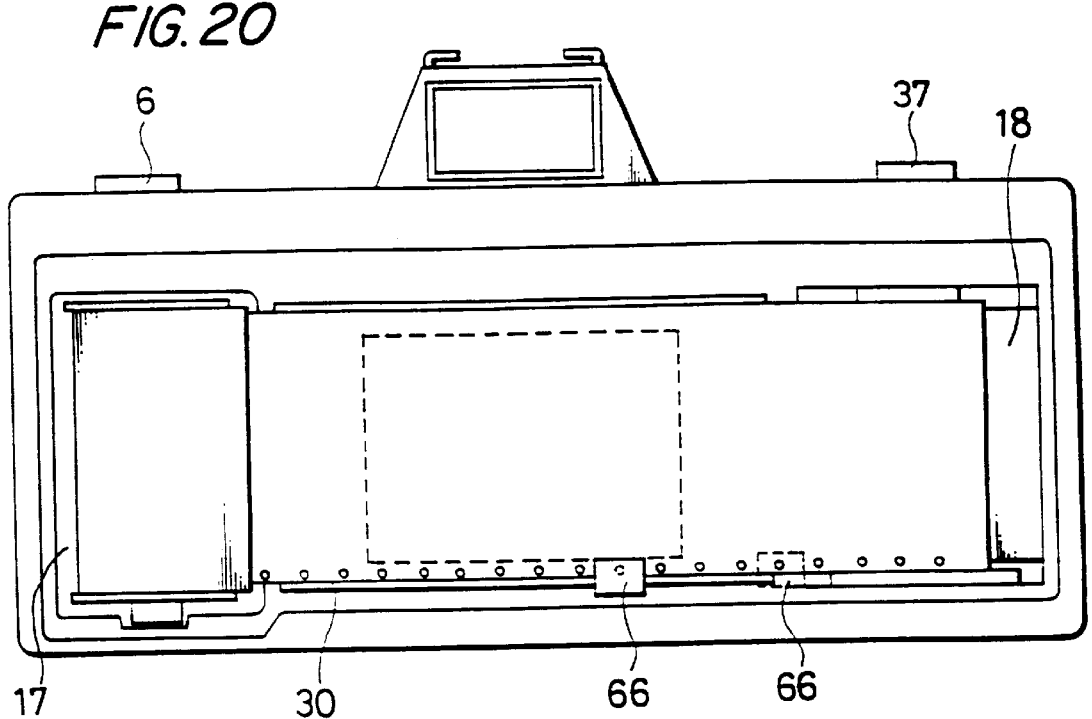
FIGS. 20A through 20C are rear elevational views of a photographic camera with a rear lid removed according to an embodiment of the present invention.
Figure 21:
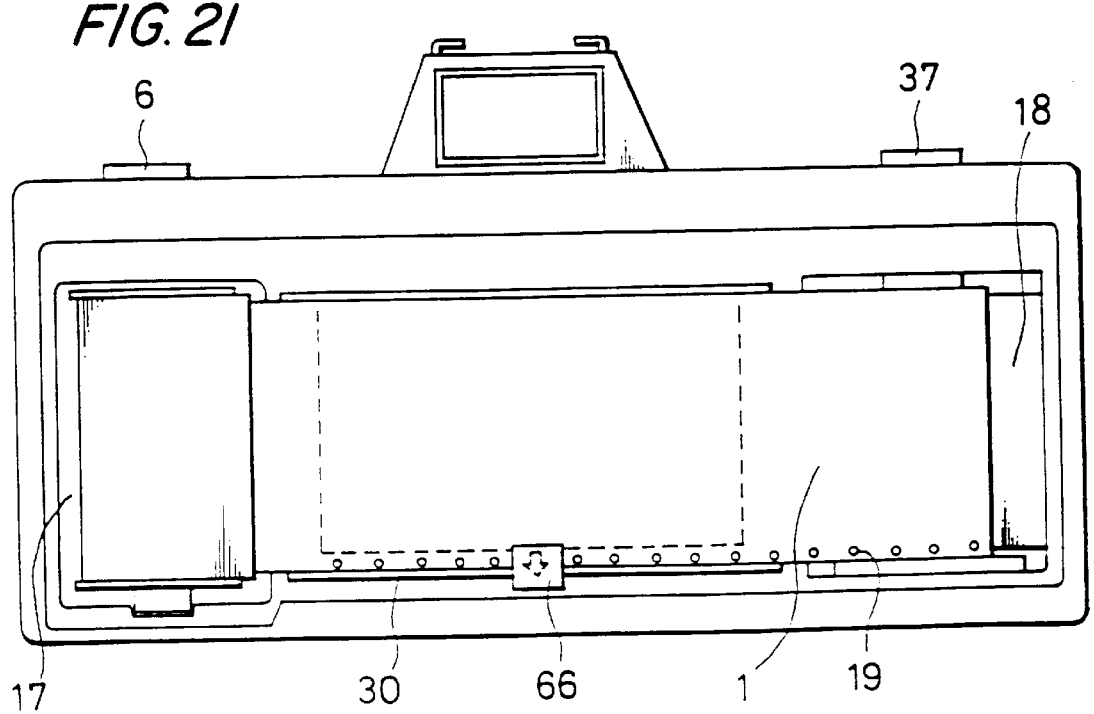
FIG. 21 is a rear elevational view of a photographic camera with a rear lid removed according to still another embodiment of the present invention.

In the above-described photographic camera, the LED 5a and the photodetector 5b are disposed in confronting relationship to each other for detecting the film position detecting holes 19, however, as shown in FIGS. 20A and 21, a photocoupler 66, which is an integral combination of an LED and a photodetector for detecting a film position, may be disposed on a film guide 30. The photocoupler 66 may be positioned anywhere on the film guide 30. The photocoupler 66 may have LEDs 41, 40, as shown in FIG. 5, for recording the frame number signal 41a and the central mark 40a at the same time that the frame is exposed.

Figure 20B:
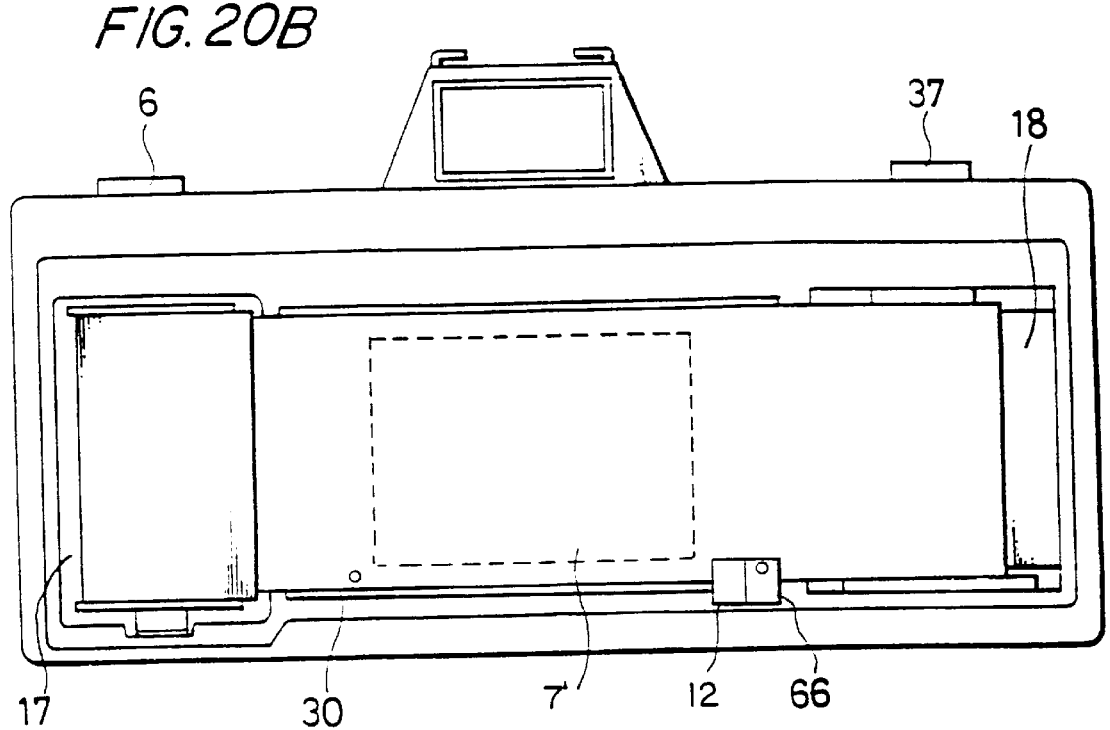

FIG. 20B shows the photographic camera having a photocoupler 66 for detecting a film position and a LED 12 for recording a signal. The camera has two variable masks on both sides of the exposure opening 7' and exposes a frame of the subject on the film 1 as shown FIG. 11G. Similarly, a frame of the subject is exposed on the film 1 as shown in FIGS. 11H and 11I corresponding to the position of the photocoupler 66 and the LED 12.

Figure 20C:
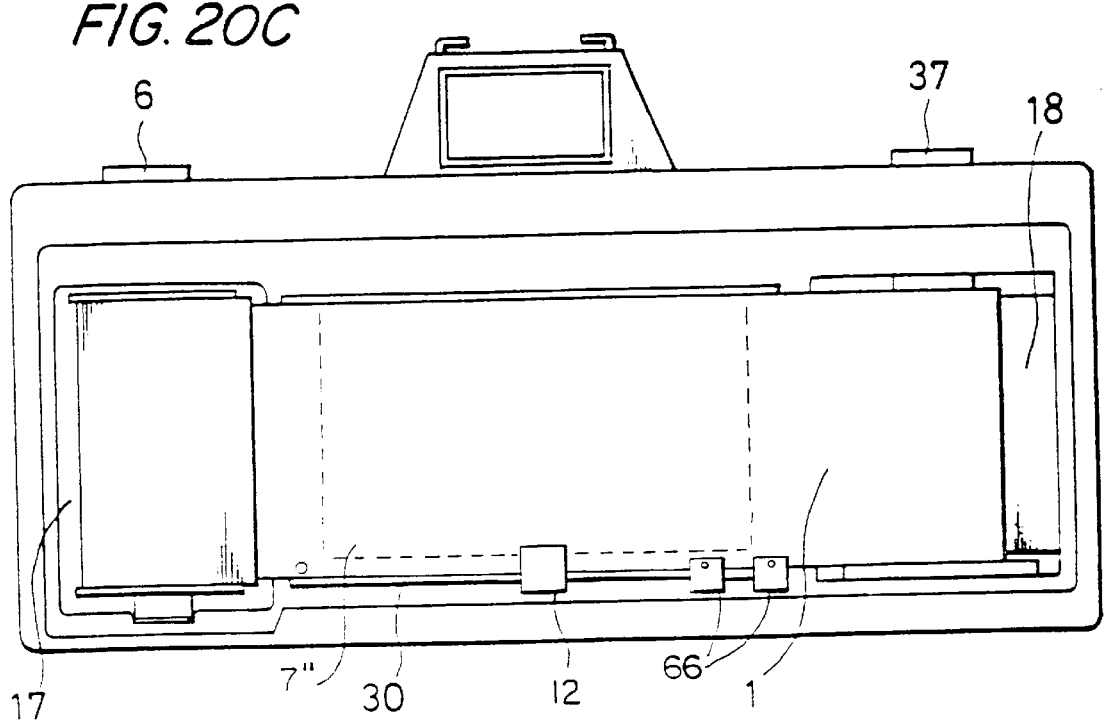

While the hole sensor 5 comprises an LED and a photodetector in the above-described photographic camera, the hole sensor 5 may comprise two pairs of an LED and a photodetector given the different distances by which frames of different sizes are fed. A camera having two pairs of the LED and the photodetector is shown in FIG. 20C and an exposed frame of the subject is shown in FIG. 11F. This camera has two variable masks on both sides of the exposure opening 7".

The above embodiment relates to an automatic printer in which a processed film or a processed spliced film is printed continuously from an initial frame to an end frame thereof. In practice, however, an extra print of a specific frame is often requested. If such request is made to a printing laboratory, conventionally an operator must manually operate a printing machine to determine the specific frame number to be printed. The automatic printer of the present invention eliminates the need for manual intervention by the operator.

Figure 22:
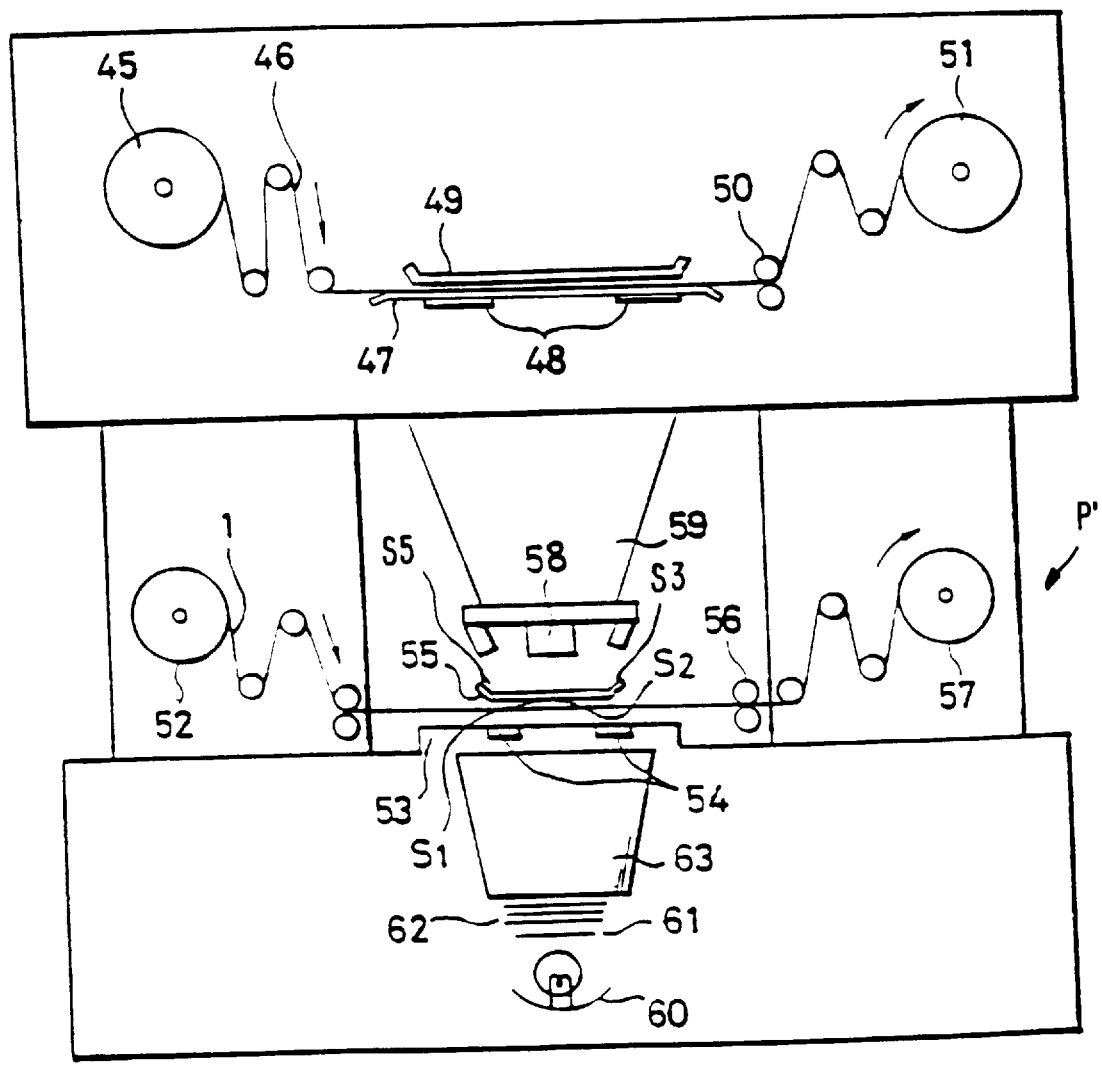
FIG. 22 is an elevational view of an automatic printer for printing on photosensitive paper processed film that was exposed using a photographic camera according to an embodiment of the present invention.

FIG. 22 is an elevational view of an automatic printer P' for printing on photosensitive paper a processed film as shown, for example, in FIG. 1. In FIG. 22, a photosensor S5 is provided on the automatic printer P' for detecting frame information such as the frame number signal 41a recorded on the film 1. Note that the reference numerals of FIG. 22 that are common to FIG. 13 show the same parts as shown in FIG. 13 so a detailed explanation is therefore omitted. Alternatively, the photosensor S5 may be comprised of a magnetic head S5' that reads a frame number signal 41a magnetically recorded in the marginal area 19" of the film.

A control system CS' for the automatic printer shown in FIG. 22, according to an embodiment of the present invention, is shown in FIG. 23, in which the photosensor S5 and/or magnetic head S5' is connected to the microprocessor 64 as a logic circuit means, such as that shown in FIG. 14, and in which a controller 100 is also connected to the microprocessor 64. The controller 100 includes a power switch 102, input key buttons 104, a change-over switch 106, a start button 108, and a display 110. A lamp 60, shown in FIGS. 13 and 22, is connected to the controller 100. The microprocessor 64 includes a memory 112 which communicates with the sensor S5 (S5') and the controller 100. Other reference numerals of FIG. 23 that are common to FIG. 14 show the same parts as shown in FIG. 14 so a detailed explanation is therefore omitted.

When extra prints are requested, the processed film 1 is set in the printer P', and then the power switch 102 is turned on. If two extra copies of frame number 7, three extra copies of frame number 10, and one extra copy of frame number 15 are requested, an operator initially pushes the change-over switch 106 and the depresses key 7 of the key buttons 104 to designate a specific frame number to be printed. At this time, the display 110 indicates FRAME No.: 7, as shown in FIG. 24. The operator then pushes the change-over switch 106 and depresses key 2 of the key buttons 104. At this time, the display 110 indicates PRINT AMOUNT: 2, as shown in FIG. 24. It should be understood that when the change-over switch 106 is operated, the controller 100 switches between a frame number input mode and an extra copy amount mode, and after the key buttons 104 are depressed, predetermined input data are supplied to the display 110 so that the operator can recognize the input condition using the display 110. After the first set is finished, the operator pushes the change-over switch 106 and then depresses keys 1 and 0 of the key buttons 104. At this time, the display 110 indicates FRAME No.: 10 (not shown). The operator then pushes the change-over switch 106 and depresses key 3 of the key buttons 104. At this time, the display 110 indicates PRINT AMOUNT: 3 (not shown). The data input using the key buttons 104 are stored in the memory 112. Next, the operator pushes the change-over switch 106 and then depresses keys 1 and 5 of the key buttons 104. At this time, the display 110 indicates FRAME No.: 15 (not shown). The operator then pushes the change-over switch 106 and depresses key 1 of the key buttons 104. At this time, the display 110 indicates PRINT AMOUNT: 1 (not shown). The data input using the key buttons 104 are stored in the memory 112 as well.

After the data of the frame numbers and the number of extra prints or copies are input, the operator depresses the start button 108. The film 1 is then driven in the predetermined direction by the motor M1 as described above. During feeding of the film 1, the sensor S5 or the magnetic head S5' detects the frame number signal 41a ir 41a' recorded in the marginal area of the film 1. An output signal derived from the sensor S5 or the magnetic head S5' is compared with the data stored in the memory 112. When the sensor S5 of the magnetic head S5' detects frame number 7 based on the frame number signal 41a or 41a' and the output signal corresponds with the content stored in the memory 112, the microprocessor generates a control signal that stops the motor M1. At this point, the frame center is determined based on the central mark 40a or 40a' detected by the frame center sensor S2 or S2', and the aspect ratio information signal 12a or 12a' is read by the aspect signal sensor S1 or S1'. Then, the microprocessor 64 controls the mask size drive motor M3 to position the variable mask 48 to conform with the determined print size based upon the aspect ratio information signal 12a or 12a'. The microprocessor 64 also controls the drive motor M2 to actuate the variable slit 54 as discussed above. After the variable mask 48 and variable slit 54 are set to a predetermined width based upon the aspect ratio information signal 12a or 12a', the microprocessor 64 energizes the lamp 60 to print the image of frame number 7 recorded on the film 1 to the print paper 64. The microprocessor 64 then energizes the lamp 60 and drives the motor M4 two more times to produce additional prints based upon an output signal from the memory 112.

After the extra prints of frame number 10 are made based on frame information such as the frame number signal 41a or 41a', the microprocessor 64 controls the drive motor M1 to feed the film 1. The sensor S5 or the head S5' detects the frame number signal 41a or 41a' of frame number 10 and an output signal from the sensor S5 or the head S5' corresponds with the contents stored in the memory 112, the microprocessor generates a control signal that stops the motor M1. At this point, the frame center is determined based on the central mark 40a or 40a' detected by the frame center sensor S2 or S2' and the aspect ratio information signal 12a or 12a' is read by the aspect signal sensor S1 or S1'. Then, the microprocessor 64 controls the mask size drive motor M3 to position the variable mask 48 to conform with the determined print size based upon the aspect ratio information signal 12a or 12a'. The microprocessor 64 also controls the drive motor M2 to actuate the variable slit 54 as described above. After the variable mask 48 and variable slit 54 are set to a predetermined width based upon the aspect ratio information signal 12a or 12a', the microprocessor 64 energizes the lamp 60 to print the image of frame number 10 recorded on the film 1 to the print paper 64. The microprocessor 64 then energizes the lamp 60 and drives the motor M4 one more time to produce additional prints based upon an output signal from the memory 112. It is noted that a similar sequence is performed to produce extra prints of frame number 15.

In a typical printing laboratory, the lamp 60 and the filter assembly 62 are manually adjusted and controlled in order to obtain a picture having optimal color and optimal brightness conditions before the print is made. Data for adjusting and controlling color and brightness may be magnetically recorded on an unexposed edge area of each frame of the film 1 by a read/write magnetic head S6, as shown in FIG. 13. After the color and brightness data are recorded, printing is performed to produce prints or pictures having the optimal color and the optimal brightness. If extra prints are requested, the recorded data for adjusting and controlling color and brightness may be used again. Additionally, a plurality of processed films, such as a first film, a second film, a third film, and so on, may be accumulated in the printing laboratory and spliced end to end to form a long, continuous film strip. A typical printing laboratory generally operates as follows:

(1) Color and/or brightness data may be used for adjusting an initial frame of the first film of the spliced film, but cannot be used for adjusting the color and/or the brightness of subsequent films of the spliced film.

(2) A film for which extra prints are requested is often printed by another printing laboratory.

A printer of the present invention may have an automatic print mode and an automatic preset mode for the extra printing requests. In the automatic print mode, the printer automatically prints according to the recorded adjustment and control data. In the automatic preset mode, after the printer automatically presets the lamp 60 and filter assembly 62 according to the recorded adjustment and control data, the printer enters a standby mode and waits to accept an execute order for printing and a change order for presetting.

In the above-described automatic printer, a single photographic film contains frames corresponding to different picture sizes, however, the present invention is also applicable to an automatic printer for automatically printing a spliced sequence of photographic films with different frame numbers.

The present invention uses an exposure control signal magnetically or optically recorded between an edge of the photographic film and an effective exposure area of the photographic film. This exposure control signal can be used not only by the processor but also by the user, and the user can print using a simple printer system according to the present invention. For example, a simple home system can be combined with a computer system or a television for display. Also, the exposure control signal may include an auxiliary signal for controlling a printer system or for indicating certain features to the user. Thus, the present invention as described above can be used for numerous applications because it avoids using the notched film required in previously proposed systems.

In the above-described photographic film, the aspect ratio information signal is based on an optical mark, however, the photographic film may alternatively have a transparent magnetic ink layer on its surface. The aspect ratio information signal can then be recorded as a magnetic mark on the magnetic ink layer. Thus, in the camera the aspect ratio information signal recording device 12 may be a magnetic head and in the printer the aspect signal sensor S1 may be a magnetic head.

In the above-described photographic film, the aspect ratio information signal is an optical mark or a magnetic mark as described above, however, the mark may also be a binary or analog data signal. This data signal may include error correcting data, decoder data for decoding the aspect ratio information signal or other signals, and a data synchronizing signal for accurately reading the decoder data and the error correcting data.

Having described preferred embodiments of the invention with reference to the accompanying drawings, it is to be understood that the invention is not limited to those precise embodiments and various changes and modifications could be effected by one skilled in the art without departing from the spirit or scope of the present invention, as defined in the appended claims.

What is claimed is:

1. A photographic film printer comprising:
   a printer body;
   light source and mask means for exposing photosensitive paper;
   processed photographic film drive means disposed on the printer body for driving a processed photographic film;
   detecting means disposed on the printer body for detecting aspect ratio information, frame number information and a frame position signal recorded on the processed photographic film and for detecting an exposure control signal used to control the light source and mask means, wherein the aspect ratio information and the frame position signal indicate an area to be printed;
   logic circuit means connected to the detecting means, the light source and mask means, and the processed photographic film drive means; and
   controller means connected to the logic circuit means and having frame designating means for designating a quantity of prints for a specific frame of the processed photographic film.

2. The photographic film printer according to claim 1, wherein the exposure control signal includes an auxiliary signal for a printer control signal.

3. The photographic film printer according to claim 1, wherein the processed photographic film has recorded thereon an exposure date.

4. The photographic film printer according to claim 1, wherein the logic circuit means judges whether the detected aspect ratio information is correct or not, and the controller means controls the light source and mask means to expose an image in the specific frame of the processed photographic film onto the photosensitive paper in accordance with the judged aspect ratio information.

5. The photographic film printer according to claim 1, wherein the controller means further includes additional print input means for inputting a quantity of additional prints requested of the specific frame of the processed photographic film.

6. The photographic film printer according to claim 1, wherein the controller means further includes frame designating input means for inputting a designated frame of the processed photographic film.

* * * * *